United States Patent [19]

Fujiwra et al.

[11] Patent Number: 4,755,662

[45] Date of Patent: Jul. 5, 1988

[54] AUTOMATIC FOCUS DETECTING DEVICE

[75] Inventors: Akihiro Fujiwra, Yokohama; Takashi Amikura; Masamichi Toyoma, both of Tokyo, all of Japan

[73] Assignee: Canon Kabushiki Kaisha, Japan

[21] Appl. No.: 913,628

[22] Filed: Sep. 30, 1986

Related U.S. Application Data

[63] Continuation of Ser. No. 603,660, Apr. 26, 1984, abandoned.

[30] Foreign Application Priority Data

| Apr. 28, 1983 | [JP] | Japan | 58-75864 |
| May 30, 1983 | [JP] | Japan | 58-96487 |
| May 30, 1983 | [JP] | Japan | 58-96488 |
| Jun. 9, 1983 | [JP] | Japan | 58-103179 |
| Jun. 9, 1983 | [JP] | Japan | 58-103181 |
| Jun. 9, 1983 | [JP] | Japan | 58-103182 |
| Jun. 9, 1983 | [JP] | Japan | 58-103183 |
| Jun. 9, 1984 | [JP] | Japan | 58-103180 |

[51] Int. Cl.⁴ .............................. G01J 1/36
[52] U.S. Cl. ..................... 250/201; 250/204
[58] Field of Search ............ 250/201 AF, 201 R, 204

[56] References Cited

FOREIGN PATENT DOCUMENTS 138427 10/1979 Japan .................................. 250/204

Primary Examiner—Gene Wan
Attorney, Agent, or Firm—Toren, McGeady & Associates

[57] ABSTRACT

In the disclosed automatic focus detecting device for an imaging optical system a light spot is projected onto an object and an image of the object is formed on a predetermined focal plane. A light receiving photo-sensitive element produces at least two signals according to the position of the reflection of the projected light spot. A comparator detects when the relation between the integrated values of outputs of the light receiving element exceeds a predetermined level. A detector means detects when the light spot image has been projected for a predetermined time and a determining arrangement determines the focus of the imaging optical system on the basis of the outputs of the light receiving element when at least either the comparator or time detector detects the predetermined level or length of time.

24 Claims, 25 Drawing Sheets

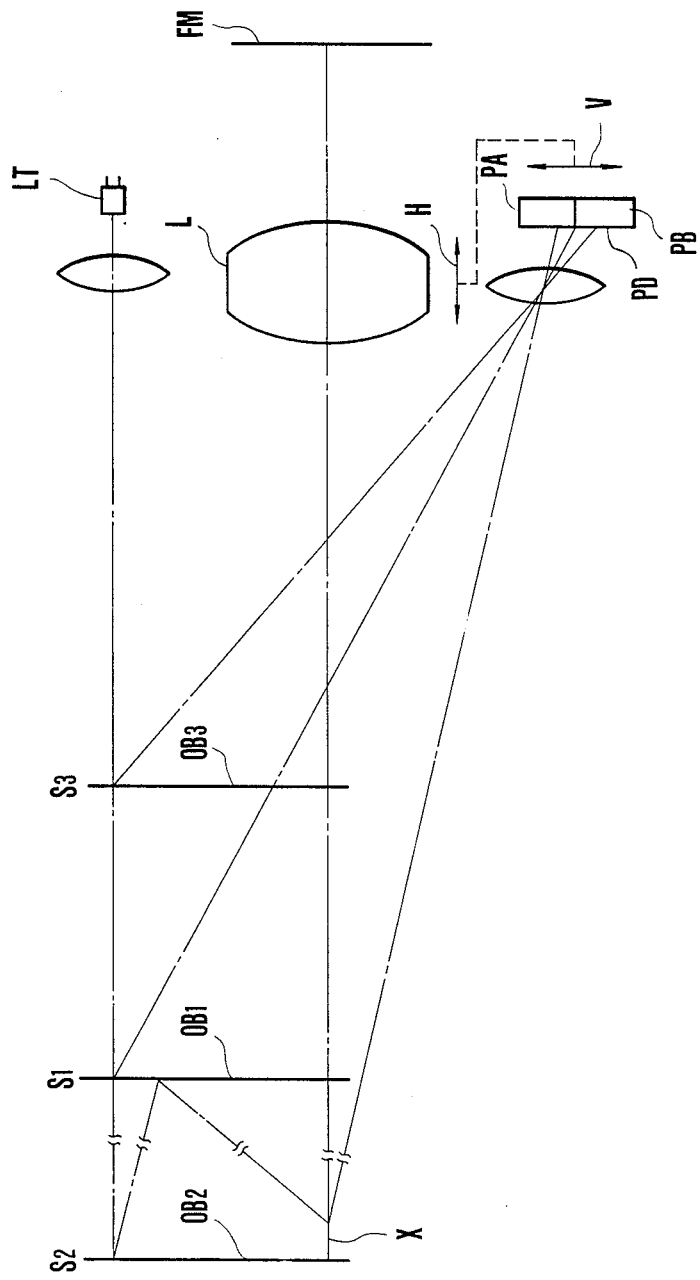

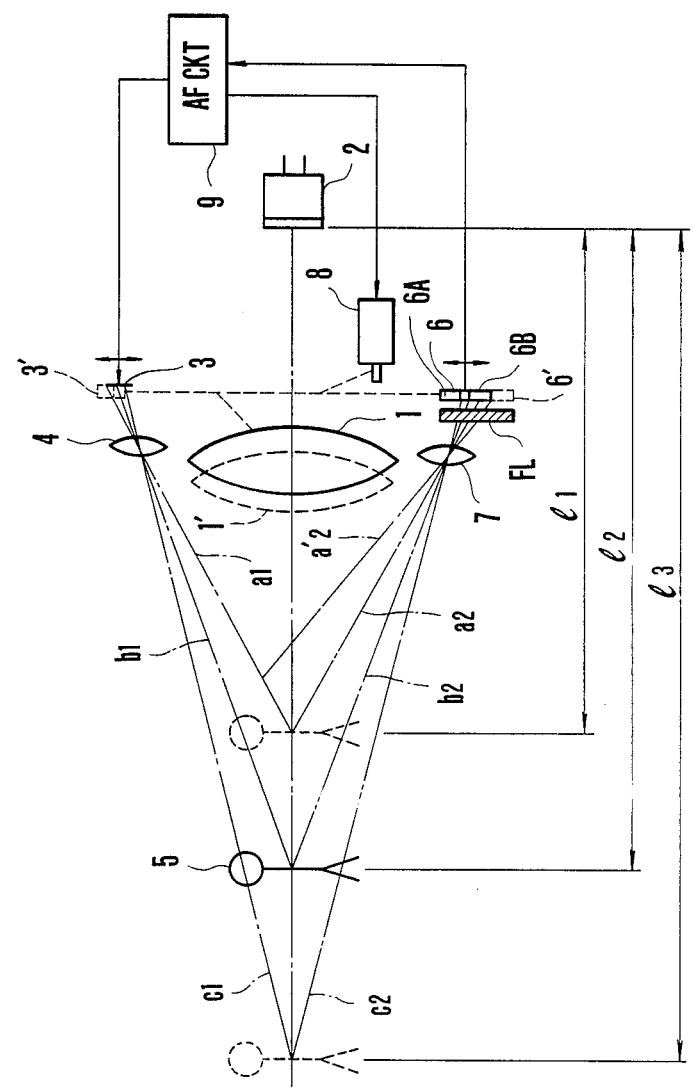

6A  P   6B 6A   6B  P

F I G.12
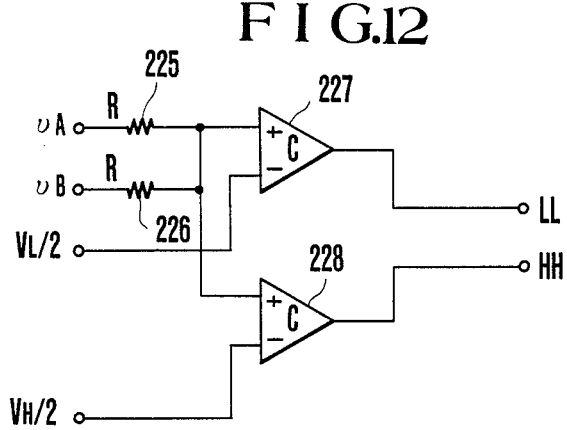
F I G.13
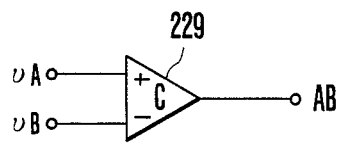
F I G.14
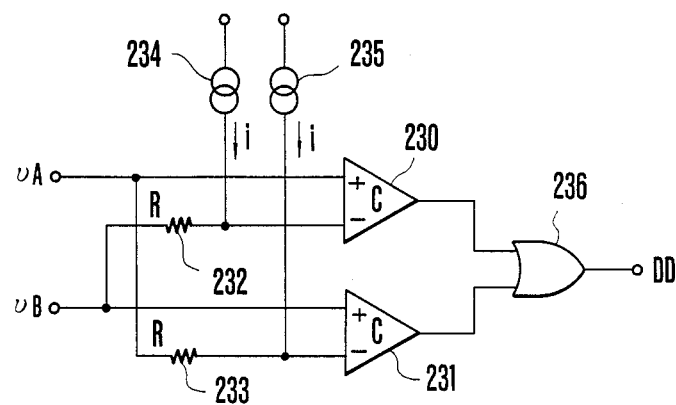

$t < T_0$ $V_H > vA+vB > V_L$ $|vA-vB| = V_D$

F I G.29(a)
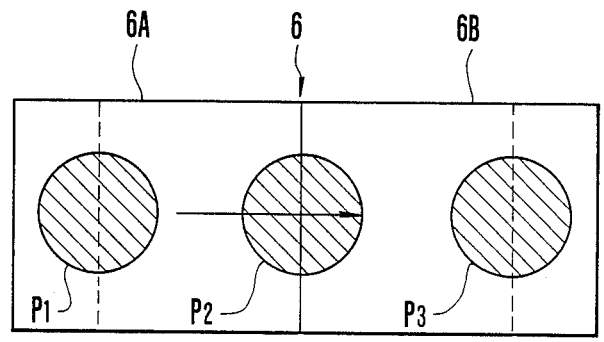
F I G.29(b)
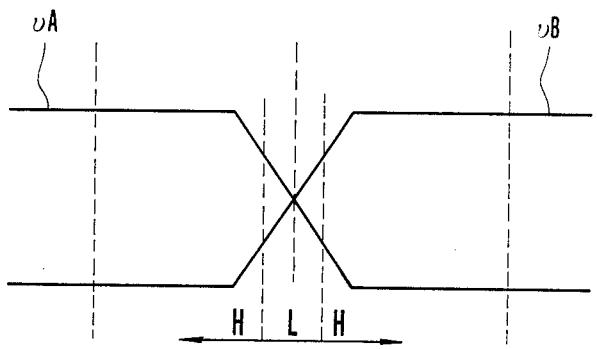

F I G. 31(a) 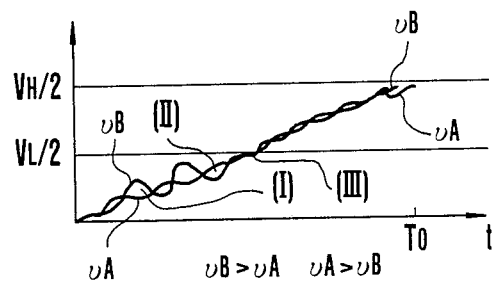
F I G. 31(b) 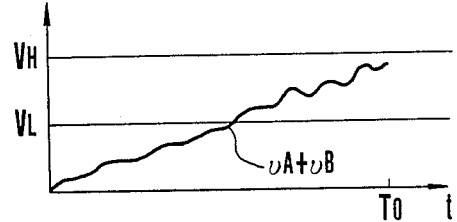
F I G. 31(c) 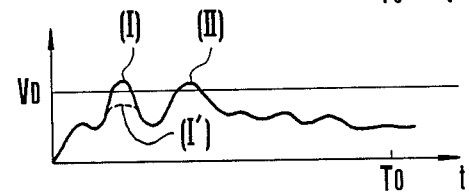
F I G. 32(a) 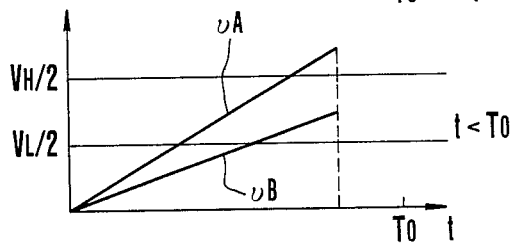
F I G. 32(b) 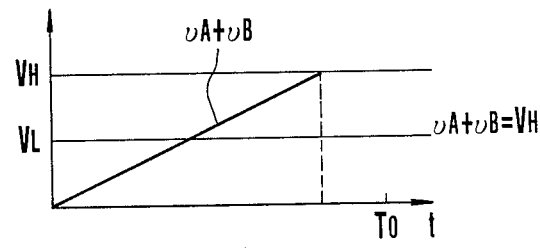
F I G. 32(c) 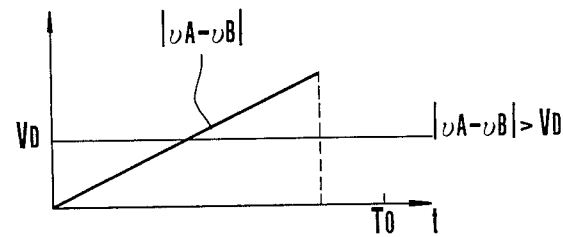

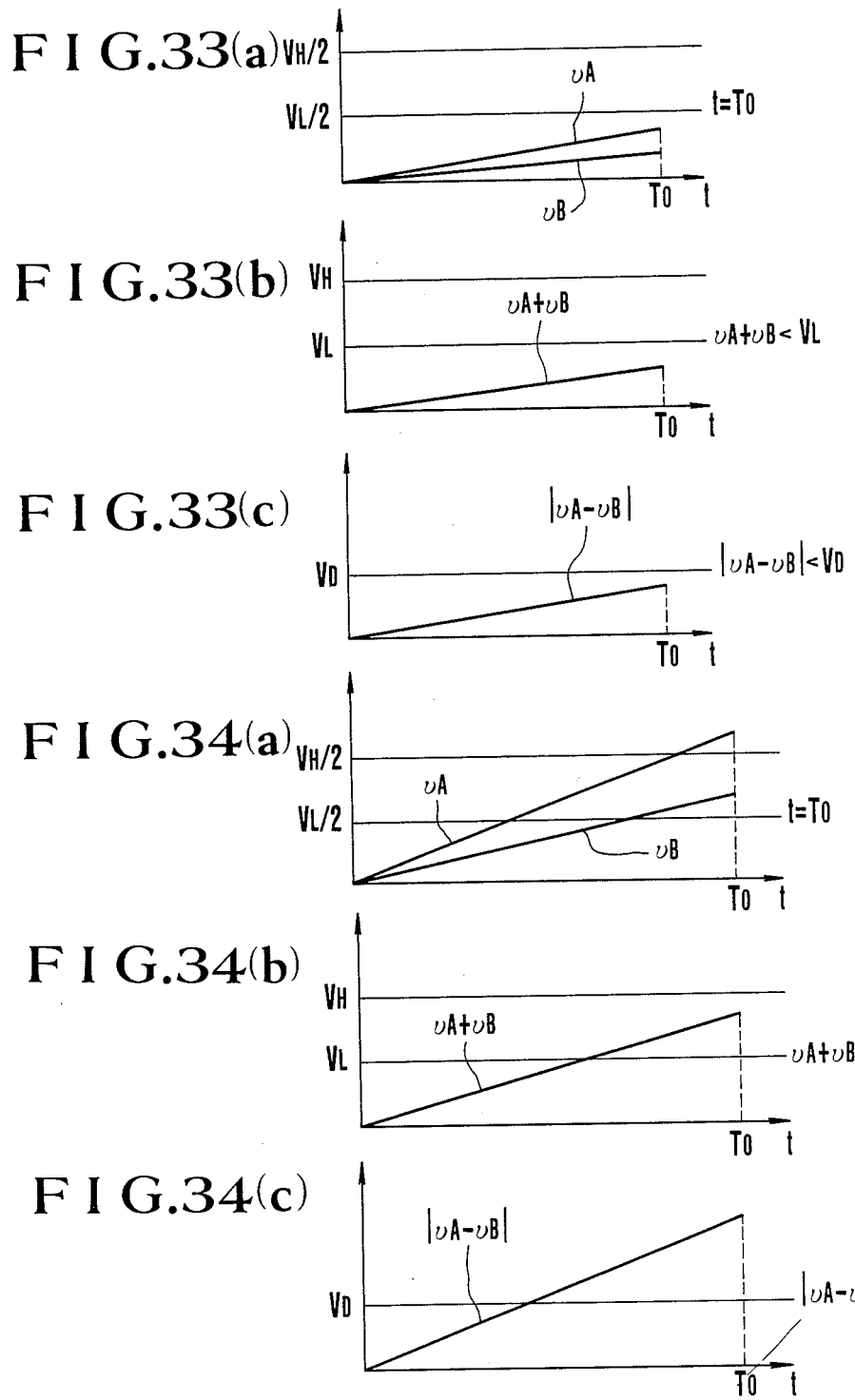

AUTOMATIC FOCUS DETECTING DEVICE

This is a continuation of application Ser. No. 603,660, filed Apr. 24, 1984 now abandoned.

BACKGROUND OF THE INVENTION

1. Field of the Invention

This invention relates to an automatic focus detecting device, and more particularly to a device in which a distance measuring light is projected onto an object, a reflection resulting from the projected light is received by a light receiving or photo-sensitive element having two divided light receiving areas, the focus of a phototaking lens is determined, and a signal is produced for controlling the focus on the basis of photo-electric signals generated by the light receiving areas.

2. Description of the Prior Art

FIG. 1 of the accompanying drawings shows a typical example of the conventional automatic focus detecting device for an imaging optical system. Here, a light projecting element LT projects a light spot onto an object OB. A light receiving photo-sensitive element PD composed of two divided photo-sensitive areas PA and PB receives a reflection of the projected light spot. The distance to the object OB or the focus of the imaging optical system is detected on the basis of the position of the reflected light on the element PD. More specifically stated with reference to FIG. 1, let us assume that the light projecting element LT projects a light spot onto an object OB1 which is located at a distance S1 and that the projected light spot impinges on and is reflected by the object OB1 to form a reflected light spot image just at a mid point between the photo-sensitive areas PA and PB of the light receiving element. Then, for an object located at another point S2 which is farther than the point S1, the reflected spot image is formed at a point on the light receiving element PD deviating from the mid point and toward the photo-sensitive area PA upward in the direction of arrow V as shown in FIG. 1. The extent of the deviation increases as the distance between the points S1 and S2 increases.

For another object OB3 which is located nearer to the apparatus than the point S1, the reflection is formed at a point on the light receiving element PD away from the mid point toward the other photo-sensitive area PB and down in the direction of arrow V as shown in FIG. 1. Accordingly, the current distance to an object can be found by detecting the position of the reflected light spot image on the light receiving element PD.

More specifically, the photo-sensitive areas PA and PB produce respective outputs whose values correspond to the quantities of light striking them. Therefore, the position at which the reflected light spot image is formed can be found by comparing the outputs of the photo-sensitive areas PA and PB of the light receiving element.

Furthermore, with an imaging optical system L arranged to form an image of an object on a predetermined focal plane FM as shown in FIG. 1, the focal point of the imaging optical system is adjusted according to the distance to the object detected as mentioned. For this purpose, the light receiving element PD is moved toward either one of the photo-sensitive areas PD and PB whichever is producing a larger output than the other in the direction of arrow V. Then, the imaging optical system L is shifted in the direction of arrow H along its optical axis X in association with the movement of the light receiving photo-sensitive element PD to make the imaging optical system L come to an in-focus position when the reflected light spot image arrives at the mid point between the photo-sensitive areas PA and PB. In other words, the optical system is in focus when the difference between the output of the photo-sensitive areas PS and the other area PB is zero. A near-focus condition (a condition in which the focal point of the imaging optical system is in front of the predetermined focal plane) prevails when the output of the photo-sensitive area PB is larger than the photo-sensitive area PA. A far-focus state (a condition in which the focal point of the imaging optical system is behind the predetermined focal plane) occurs when the output of the photo-sensitive area PA is larger than that of the other area PB. If the system is in a near-focus state, the imaging optical system L is shifted toward the predetermined focal plane FM, or to the right along the arrow H. The optical system L is shifted in the reverse direction, or to the left, along arrow H relative to the predetermined focal plane, in response to a far-focus condition. Performing this operation either manually or automatically allows the imaging optical system to be brought into focus.

As is well known, a device of this type which determines a near-focus, in-focus or far-focus condition, cannot detect the focus accurately before the integrated value of the output of the light receiving photo-sensitive element reaches a given level. For example, in the device described above, the moment the reflected light spot just impinges upon the light receiving element PD, both the outputs of the photo-sensitive elements PA and PB are nearly at noise level. Therefore, initially, it is hardly possible to find the point where the light spot image is formed. After integrating the output of the light receiving photo-sensitive element, the ratio of the signal S to a noise level N, i.e. S/N ratio, increases as the signal level increases. Eventually it becomes possible to compare the output levels of the photo-sensitive areas PA and PB with each other for accurate detection of the focal point. In other words, in order that the focal point detection be accurately accomplished, the reflected light spot must be continuously applied to the light receiving photo-sensitive element over a given length of time to permit the received light signal to be integrated sufficiently.

Therefore, automatic focus detecting devices of this kind have been arranged to project the light spot image continuously over a predetermined period of time and to detect the focal point by comparing the outputs of the light receiving element after the light quantities received have been sufficiently integrated.

However, the light intensity of the reflection upon the light receiving element varies to a great extent according to the distance and the reflection factor of the object. If the length of time for projecting the projection light spot image is fixed, the light spot has to be projected until the end of the fixed time even after the integrated value of the output of the light receiving element has already reached a focus detectable level.

This not only wastes electric energy but also results in an unnecessarily long time for detecting the focus. For a compact camera whose size does not permit the use of a high capacity power source and which must detect the focus at high speed to allow the photographer to seize a momentary picture taking opportunity, this has been quite a serious problem.

SUMMARY OF THE INVENTION

A first object of this invention is to solve the aforementioned problem of the prior art by providing an automatic focus detecting device which operates with a high detecting speed without wasting electrical energy. In the device, a photo-sensitive element receives reflected light coming from a spot of light projected on an object, and produces signals on the basis of the points struck by the reflected light. The output of the light receiving element is integrated. An image of the object is formed on a predetermined focal plane by an imaging optical system on the basis of the integrated value of the output of the light receiving element. To attain the aforementioned first object, the automatic focus detecting device according to the invention comprises time detecting means for detecting that the length of time during which the above-stated light spot is projected on the object has reached a predetermined length of time; level detecting means for detecting that the integrated value of the output of the above-stated light receiving photo-sensitive element has reached a predetermined level; and determining means for determining the focused state of the imaging optical system on the basis of the output of the light receiving element when either of the time detecting means or the level detecting means detects the predetermined time or level. The arrangement of the device is such that focus detection is promptly accomplished when the integrated value of the output of the light receiving element reaches a focus detectable level, so that the power consumption can be saved and the focus detection speed can be increased.

A second object of the invention is to provide an automatic focus detecting device capable of operating stably and maintaining good distance measuring accuracy. This object is directed to the solution of the following problem: After an imaging optical system which is included in the automatic focus detecting system reaches a focused condition, the imaging optical system might be defocused by an erroneous out-of-focus signal due to a noise or the like. One method for solving this problem involves broadening the range within which the imaging optical system can be considered in focus, i.e. a dead band, after attainment of a focused condition so as to inhibit a shift of the optical system by a signal within this dead band. However, while the operation of the device may be stabilized by this method, the above-stated dead band is broadened at the expense of the focus detection.

In other words, this method raises another problem. If the optical system really becomes defocused without noise or the like, this defocus state could be promptly detected were the dead band not broadened. With the dead band broadened, the defocus cannot be detected or, even if detected, a delay would occur in the detecting operation. This would cause the photographer to miss a momentary picture-taking opportunity. The problem is serious in an automatic focus detecting device of the kind required to enable a camera to seize such an opportunity without fail.

To attain this object in view of these problems, the device according to the invention is so arranged that, after the dead band is broadened in the focused condition, the dead band is again narrowed when the in-focus condition is repeatedly detected for a plurality of times. This allows not only stabilization of the operation of the device but also maintenance of a high degree of detecting accuracy. To attain the second object, the device according to the invention is provided with a first focus detecting system having a narrow in-focus state determining range in detecting the focal point of the imaging optical system; and a second focus detecting system having a wider in-focus state determining range. When an in-focus state is determined by the first focus detecting system, a next focus detecting operation is performed by the second focus detecting system. Then, if the in-focus state is continuously and repeatedly determined for a plurality of times by the second focus detecting system, the first focus detecting system performs a further focus detecting operation.

A third object of this invention is to further improve the first automatic focus detecting device arranged to attain the first object. In the device of the first object, the attainment or non-attainment of the focus detectable level by the integrated value of the output of the light receiving element is judged by the levels of two integrated values and by comparing the magnitudes of these integrated values. The arrangement of the first device performs an automatic focus detecting operation promptly when the integrated values reach the focus detectable level so as to prevent an electric charge from being wasted.

If the light level received from the reflected light spot is low due to a long distance to the object or the like, the first device tends to be affected by a noise, etc. Thus the device may detect the magnitude relation between the above-stated integrated values erroneously.

The third object is directed to the solution of this problem. The third device, which achieves the third object, is capable of not only preventing waste of electric energy but can also accurately determine whether or not the integrated values of the outputs of the light receiving photo-sensitive element have reached a focus detectable level.

A fourth object of the invention is to provide a further improvement over the automatic focus detecting device arranged to attain the first object.

In the conventional device shown in FIG. 1, the imaging optical system tends to be erroneously judged as in-focus while it is actually still out-of-focus when an object is first located at a very long distance and then comes nearer. This occurs because the light quantity reflected by the light spot and received by the system is small. With the imaging optical system automatically shifted to a focused position, the optical system stops while defocused and the focus of the optical system is no longer adjusted. This has been a serious problem. The fourth object of the invention is to prevent the above-stated erroneous detection by an automatic focus detecting device of the kind in which a light spot is projected on an object; a light receiving element receives reflected light from the light spot and produces at least two different output signals according to the points at which the reflected light is received; and an image of the object is formed on a predetermined focal plane by an imaging optical system according to the relative magnitudes of the signals produced by the light receiving element. To attain this object, the automatic focus detecting device according to this invention comprises determining means which determines the location of the object according to the integrated values of the outputs of the light receiving element; level detecting means which detects the levels of the integrated values; inhibiting means for inhibiting the determining means from determining an in-focus state even if the integrated values of the outputs of the light receiving element reach a value indicative of an in-focus state when the determining means judges the object to be at infinity and the level detecting means judges the integrated values to be within a predetermined level range.

A fifth object of the invention is to provide an improvement on an automatic focus detecting device of the type having a dead band in which an imaging optical system is considered to be in an in-focus position and does not have to be shifted from the current position. An example of the automatic focus detecting device of the type having such a dead band is disclosed in Japanese Patent Application No. SHO 57-175485. Here the automatic focus detecting device includes first and second comparison signal producing means for producing first and second comparison signals to determine whether or not signals detected by the device are within an in-focus range. The first comparison signal is arranged to provide a narrow dead band and the second to provide a wide dead band. After an in-focus condition has been determined by the first comparison signal, further determination of an in-focus condition is arranged to be made by the second comparison signal such as to stabilize the detecting operation by the dead band and prevent degradation of the detection accuracy. This application effects a shift from the narrow dead band to the wide dead band when an in-focus state is obtained by merely broadening the range within which the difference between the above-stated integrated values can be considered as representative of an in-focus condition. Assuming that the integrated values of the outputs of photo-sensitive parts PA and PB of the light receiving element are $\Sigma PA$ and $\Sigma PB$, the comparison signal for the narrow dead band is n1, n2 (n1 < n2) and the comparison signal for the wide dead band is m1, $$m2 \begin{pmatrix} m1 < n1 \\ m2 > n2 \end{pmatrix},$$

in the above-stated previous application, an in-focus state within the narrow dead band is considered attained when a condition of $n1 < \Sigma PA - \Sigma PB < n2$ is satisfied while an in-focus state within the wide dead band is considered attained when a condition of $m1 < \Sigma PA - \Sigma PB < m2$ is satisfied. However, in accordance with this arrangement, a length of time required for coming out of the dead band increases to the extent that the dead band is widened. This necessitates a longer time for the driving operation of circuits such as those that perform light projection with the light emitting element, etc. This increases power consumption and thus presents a serious problem in an automatic focus detecting device of a camera with only a small capacity power source.

The fifth object of this invention is directed to the solution of this problem. The improvement under this object serves to reduce power consumption as well as to stabilize the operation and enhance the accuracy by making the dead band of the automatic focus detecting device variable. In accordance with this object of the invention, an automatic focus detecting device for an imaging optical system which is arranged to project a light spot on an object, to have a light receiving photo-sensitive element receive the reflected light from the light spot, to produce at least two different signals as outputs of the light receiving element according to the points at which the reflected light is received, and to form an image of the object on a predetermined focal plane according to relation in magnitude between the integrated values of these signals, first level detecting means are arranged to detect that the integrated values of the outputs of the light receiving element have reached a first predetermined level; second level detecting means are arranged to detect that the integrated values of the outputs of the light receiving element have reached a second predetermined level which is lower than the first level; comparison means are arranged to detect that relation in magnitude between the integrated values of the outputs of the light receiving element has exceeded a predetermined level; and determining means are arranged to determine the imaging optical system to be in focus when attainment of the first predetermined level is detected by the first level detecting means and to be defocused when the comparison means detects that the relation between the integrated values has exceeded the predetermined level. After an in-focus state is determined by the determining means through the first level detecting means, the determining means determines another in-focus state when the second predetermined level is detected by the second level detecting means.

Other and further objects, features and advantages of the invention will be apparent from the following description taken in connection with the accompanying drawings.

BRIEF DESCRIPTION OF THE DRAWINGS

FIG. 1 is an illustration of the conventional automatic focus detecting device.

FIGS. 2 and 3(a) and 3(b) are illustrations of the arrangement of an automatic focus detecting device according to the present invention and a manner in which focal point detection is performed.

FIG. 12 is a circuit diagram showing the circuit arrangement of a part C of FIG. 9.

FIG. 13 shows the circuit arrangement of a part D of FIG. 9.

FIG. 14 shows the circuit arrangement of the part C as another example.

FIGS. 25(a) through 36(c) are illustrations showing the integrated states of the outputs of light receiving means of the automatic focus detecting device according to the invention.

DETAILED DESCRIPTION OF THE PREFERRED EMBODIMENTS

Figure 3A:
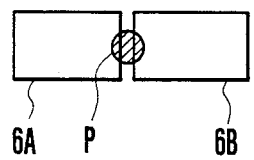

FIG. 2 schematically shows the whole arrangement of an automatic focus detecting device (hereinafter called an AF device). The illustration of FIG. 2 includes an imaging lens group 1 which participates in a focusing operation within a photo-taking lens employed as an imaging optical system; and an imaging plane 2 of an image sensor. Although the imaging plane in this particular case is that of a camera tube, it may be either an imaging plane of a solid-state image sensor or a film surface. A light emitting element 3 is arranged for projecting rays of light on a field (or, in more generic terms, a distance measuring area) and is composed of a laser diode, an infrared ray emitting diode or the like. A light projecting lens 4 is arranged to form a projected light spot image on an object 5 to be photographed or, in more generic terms, a distance measuring object. A light receiving or photo-sensitive element 2 is composed of two photo-sensitive areas 6A and 6B which are arranged to produce separate outputs. The area 6A is disposed on the side closer to the light projecting element 3 and the area 6B on the opposite side. This light receiving element 6 is composed of, for example, a two-area PIN photo diode or a charge coupled element or the like. A visible light cut filter FL is arranged to allow the light of the infrared ray emitting diode 3 to pass therethrough as much as possible while suppressing external light components. A light receiving lens 7 is arranged to form an image of a reflected light of the projected light spot image formed on the object 5 on the light receiving element 6. A motor 8 is arranged to drive a photo-taking optical system and is interlocked with the lens group 1, the light projecting element 3 and the light receiving element 6 via a cam, etc. An automatic focus detection circuit 9 (hereinafter called an AF circuit) is arranged to operate the motor 8 according to the output of the light receiving element 6 and thus to have the lens group 1 shifted to an in-focus position.

Figure 3B:
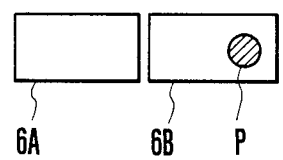

The device arranged as shown in FIG. 2 operates as follows: Let us assume that, when the object 5 is located at a distance l2 from the imaging plane, the reflected light of the projected light spot image P is received on the light receiving element 6 with the quantity of the received light equally divided between the two photo-sensitive areas 6A and 6B as shown in FIG. 3(a). In this instance, the difference VA−VB between the integrated values VA and VB of the outputs of these areas 6A and 6B becomes zero. In terms of the optical path, the light emitted from the light projecting element 3 passes through an optical path b1 to impinge on and to be irregularly reflected by the object to be photographed. The reflected light then passes through an optical path b2 to form an image on the light receiving element 6. The lens group 1 is, in this instance, considered to be in focus. If the object 5 then moves to a location at a distance l1, the focal point of the lens group 1 deviates backward to a far-focus state. Meanwhile, assuming that the positions of the light projecting element 3 and the light receiving element 6 remain unchanged, the projected light passes via the optical path b1 and is irregularly reflected by the object. The reflected light this time travels via an optical path a'2 to form an image on the light receiving element 6. In that instance, the image forming point on the light receiving element 6 deviates significantly toward the area 6B as shown in FIG. 3(b). As a result, the difference VA−VB mentioned above is no longer zero.

Then, with the extent of this deviation correlated to the extent of movement of the object 5 which can be expressed as l2−l1, the lens group 1 is shifted to a new in-focus, i.e. focused, position. More specifically, the AF circuit 9 causes the motor 8 to rotate either forward or backward according to the signal of the above-stated difference signal VA−VB (or its value in some cases). This shifts interlocked light projecting element 3, light receiving element 6 and lens group 1 via a cam, etc. The reflected light spot image is thus adjusted to a mid point between the two areas 6A and 6B on the light receiving element 6 and an image of the object located at the distance l1 is thus sharply formed on the imaging plane when the light spot image reaches to the mid point. As a result of this adjustment, the light projecting element 3 reaches to a position 3'; the boundary line between the areas 6A and 6B of the light receiving element 6 arrives at a new position 6'; and the position of the lens group 1 at a position 1'. In that instance, the projection light path follows the path indicated by b1 and the reflected light path by a'2. If the object 5 moves to a location at another distance l3, the lens group 1, etc. are shifted in directions reverse to the above-stated directions until the difference VA−VB becomes zero. The projected light path in this case is as indicated by c1 and the reflected light path by c2 respectively.

FIGS. 4–7 show automatic focus detecting devices as other embodiments operating on the same principle as that of the device of FIG. 2. In each of these embodiments, the light projecting and receiving elements are arranged in a manner different from the embodiment of FIG. 2. In these drawings, the same members as those of FIG. 2 are indicated by the same reference numerals and symbols.

Figure 4:
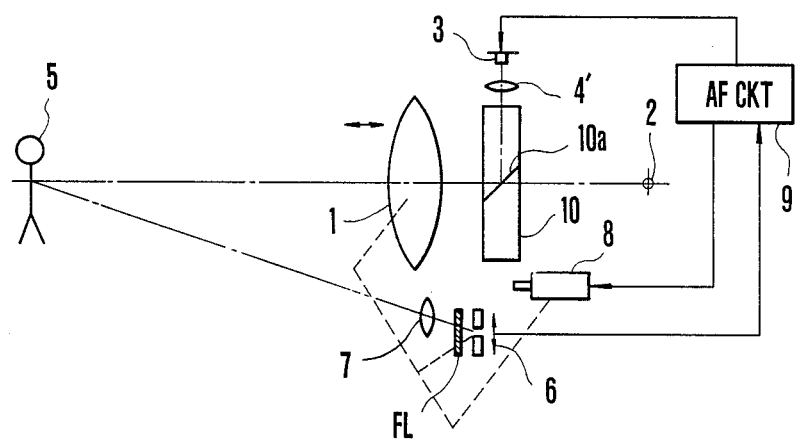
FIGS. 4 through 7 are illustrations of automatic focus detecting devices of different light projecting methods.

In the embodiment shown in FIG. 4, the projection light from the light projecting element is projected via a photo-taking lens while the light receiving element which receives the reflection light resulting from the projection light is disposed on the outside of a camera. In other words, this is of the so-called semi-TTL distance measurement type. A half-mirror 10 which has a reflection surface 10a formed as a cold mirror is disposed between an imaging plane 2 and a lens group 1 which is arranged to be shiftable for focus adjustment. A light projecting lens 4' is provided in combination with a light projecting element 3. The light projecting element 3 is preferably arranged in an optically conjugate position with the imaging plane 2. The photo-taking lens 1 is arranged to shift its position in a mechanically interlocked manner with the light receiving element 6.

Figure 5:
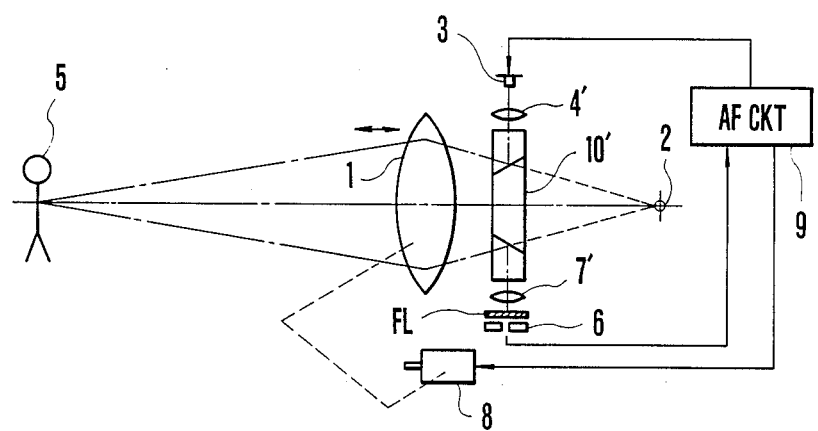

The automatic focus detecting device of FIG. 5 is of the so-called TTL distance measurement type and is arranged to have the light projection from the light projecting element and light receiving by the light receiving element both effected through the photo-taking lens. A half-mirror 10' is arranged in about the same position as the mirror 10 of FIG. 4. A reference numeral 4' denotes a light projecting lens. The light projecting element 3 is arranged in an optically conjugate position with the focal plane 2 of the photo-taking lens 1. A light projection spot image is arranged to pass through an area around the pupil of the photo-taking lens 1. A numeral 7' denotes a light receiving lens. The light receiving element 6 is arranged in an optically conjugate position with the imaging plane 2 of the photo-taking lens 1. A light ray coming to the light receiving element 6 is arranged to pass through an area which is in the vicinity of the pheriphery of the pupil of the photo-taking lens 1 but is away from the projection light flux passing area. The light projecting and receiving elements 3 and 6 are stationary and are not mechanically interlocked with the photo-taking lens 1.

Figure 6:
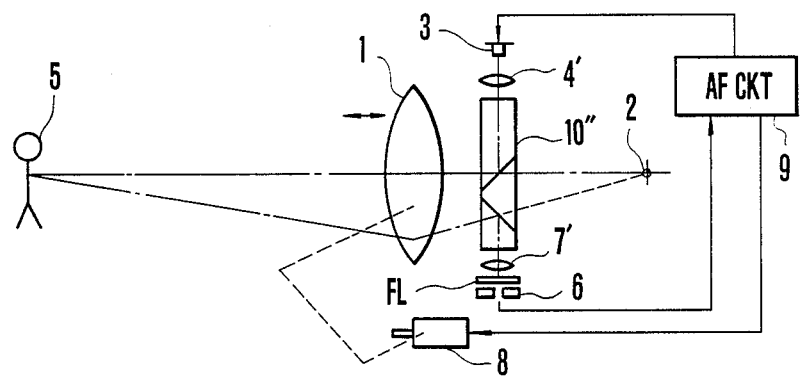

FIG. 6 shows a modification of the device of FIG. 5. In this case, the projected light flux is arranged to coincide with a photo-taking optical axis.

Figure 7:
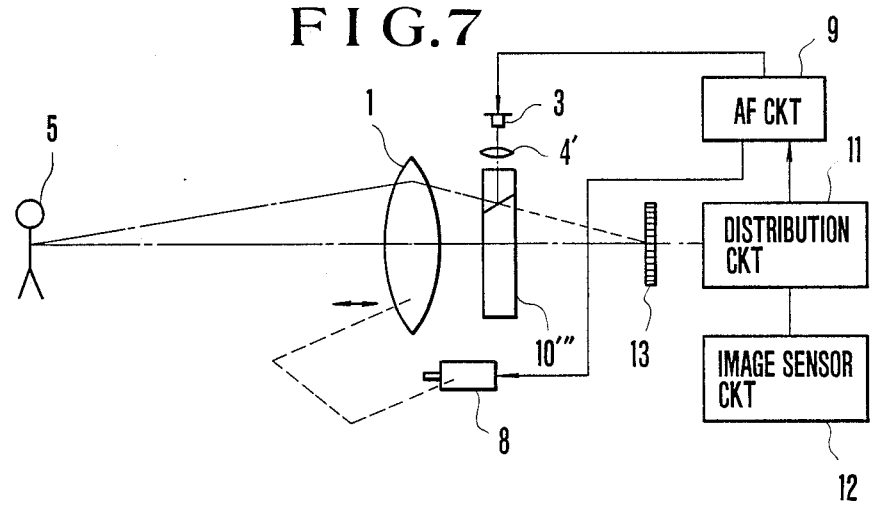
Figure 8:
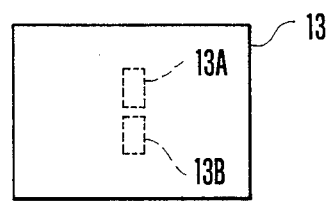
FIG. 8 is a further illustration of an image sensor shown in FIG. 7.

FIG. 7 shows an automatic focus detecting device wherein the light projecting system is arranged to be identical with that of FIG. 4. Meanwhile, an image sensor 13 is arranged at a focal plane to serve combined purposes of focusing and image sensing. An image signal representing light incident on the image sensor is divided by a distribution circuit 11 and is distributed to an AF circuit 9 and an image sensor circuit 12. The photo-sensitive surface of the image sensor 13 is arranged as shown in FIG. 8. In using the image sensor 13 for focus detection, signals produced from two zones 13A and 13B are supplied via the distribution circuit 11 to the AF circuit 9. Further, in the device shown in FIG. 7, some arrangement is necessary to allow an infrared rays to pass through the image sensor 13 during distance measurement and to be removed therefrom during an image sensing process.

Among the above embodiments, the device of the type shown in FIG. 2 is arranged to have the light projecting lens 4 and the light receiving lens 7 outside of the photo-taking lens 1. Therefore, the sizes of the light projecting and receiving lenses 4 and 7 can be increased. This type is thus advantageous in respect of an attainable distance. However, this type is disadvantageous with regard to compact arrangement of the whole device. Meanwhile, the device of the type shown in FIG. 4 has the advantage and disadvantage reversely to the type of FIG. 2. It is an additional advantage of the type of FIG. 4 that it does not necessitate the mechanical interlocking arrangement between the photo-taking lens 1 and the light projecting and receiving systems and thus contributes to simplification of the structural arrangement. The device of the type shown in FIG. 4 is intermediate in nature between the types of FIGS. 2 and 5.

Compared with the type of device in FIG. 4, the device of the type represented by FIG. 5 has a shorter base length for the light projecting and receiving systems and is disadvantageous in terms of distance measurement accuracy. However, this type together with the type shown in FIG. 6 has an advantage in that the projection light flux remains in the middle part of a view finder even in an out-of-focus condition. In the case of these types, the projected light spot image formed on the object 5 by the light projecting element 3 is located on the optical axis of the photo-taking lens at the time of an in-focus state. In other words, in each of these devices, the distance measuring zone is located in the middle of the view finder to produce no parallax.

Further, in the case of the device shown in FIG. 7, the light receiving aperture of the light receiving element 13 becomes about equal to the F-number of the photo-taking lens. Therefore, compared with the devices of other types, this type generally permits a larger light receiving aperture area and is advantageous in terms of an attainable distance. In the device of FIG. 7, the signal from the image sensor 13 is distributed to the AF circuit 9 and the image sensor circuit 12. This distribution is preferably effected in a time sharing manner for a practical application. In the light of this, the device of this type is suited for a system like a still picture video camera or the like that is arranged to complete distance measurement prior to a operation.

The electrical circuit arrangement of the device described above is shown in FIG. 9. The reflected light spot image received at the areas 6A and 6B of the light receiving element 6 as mentioned in the foregoing is photo-electric converted into light information signals. The light information signals thus obtained are supplied to and sufficiently amplified by amplification circuits 101a and 101b. The amplifiers 101a and 101b are preferably arranged to have sufficient amplification for the infrared rays forming the projected light spot image and to have a frequency characteristic suppressing as much as possible the amplification of the frequency of such modulating light as unnecessary sunlight or commercial light sources. The outputs of these amplifiers are applied to synchronous detection circuits 102a and 102b and are subjected to synchronous detection. In this instance, the synchronizing signal is of the same frequency as that of a light emission driving signal for the light projecting element 3 and is in a predetermined phase relation thereto. The outputs of the synchronous detection circuits are integrated in integration circuits 103a and 103b and increase every moment at a rate proportional to the signal intensity of the reflected light spot image. The integrated voltages VA and VB which are thus obtained separately from the integration circuit 103a and 103b through the above-stated signal processing operation are processed and determined by a computing circuit which will be described later and are thus converted into digital information signals consisting of some bits.

More specifically stated, the integrated voltages VA and VB are formed into a difference signal VA−VB by means of a subtracter 104 and into a sum signal VA+VB by means of an adder 105. The difference signal VA−VB is applied to an absolute value circuit 106 to obtain a signal |VA−VB|. The value of this signal |VA−VB| is compared at a comparator 107 with a comparison value VD and the result of comparison is produced from the comparator 107. The sum signal VA+VB is compared respectively at level detecting comparators 108 and 109 with comparison values VL and VH and the results of comparison are produced from these comparators 108 and 109. Meanwhile, the integrated voltages VA and VB are compared as they are at another comparator 110. The four digital information signals which are thus obtained including the outputs DD, LL, HH and AB of the comparators 107, 108, 109 and 110 are supplied to a sequence control circuit 111 and the operation of the whole system is determined there.

A light emission driving circuit 112 is arranged to supply a current to the light projecting element 3 in synchronism with a synchronizing signal from the control circuit 111 and controls light emission from the light projecting element 3.

A motor driving circuit 113 is arranged to control the direction and speed of rotation of a photo-taking optical system driving motor 8 in accordance with a signal coming from the control circuit 111. FIG. 10 more specifically shows the circuit arrangement of a part A shown in FIG. 9.

Figure 9:
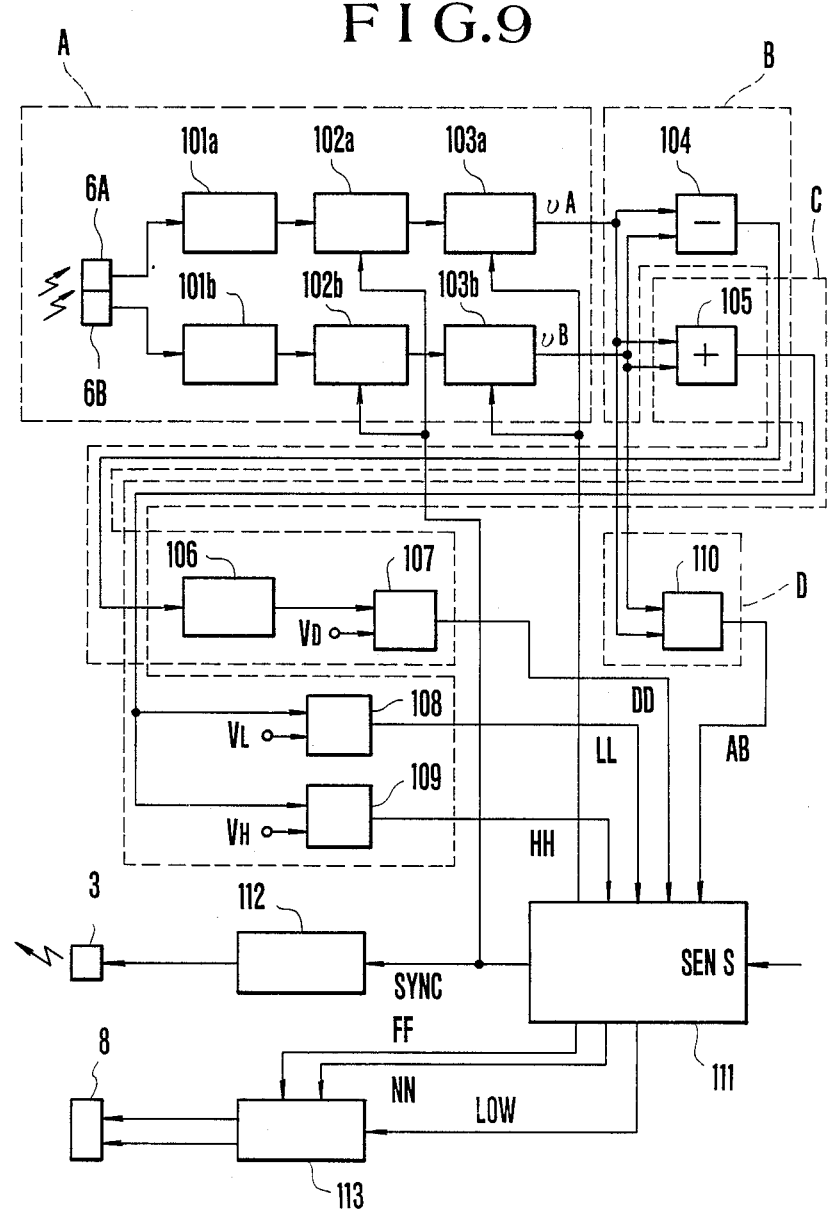
FIG. 9 is a block diagram showing the essential circuits of the automatic focus detecting device according to the invention.
Figure 10:
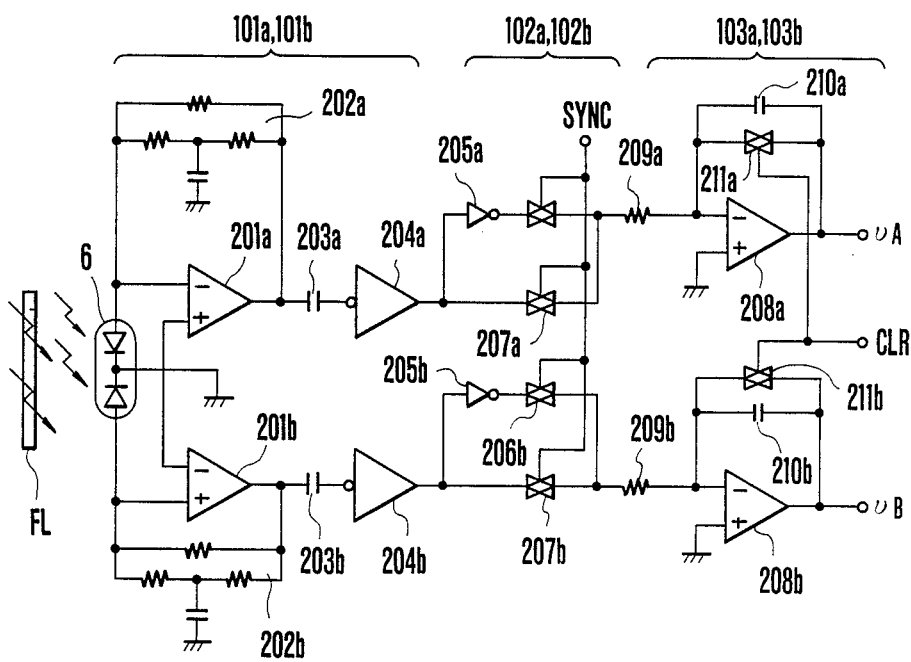
FIG. 10 is a circuit diagram showing the circuit arrangement of a part A of FIG. 9.

Referring to FIG. 10, in the part A of the circuit of FIG. 9, low-noise operational amplifiers 201a and 201b are disposed at the initial stages of the amplifiers 101a and 101b. Feedback circuits 202a and 202b are arranged to give a by-pass characteristic. Some portion of the energy of the infrared rays projected from the light projecting element 3 is reflected and returned back the light receiving element 6 together with some external light component. It is likely that this external light component may be of a large value compared with the returned energy. In combination with the use of a visible light cutting filter FL, these feedback circuits 202a and 202b serve to relatively suppress the external light component. These circuits can be as arranged as to be practicable to obtain the suppressing effect under most object conditions. Further, the DC component due to sunlight, etc. is almost completely cut by means of capacitors 203a and 203b. AC amplifiers 204a and 204b are arranged to sufficiently amplify the components in the proximity of modulation frequency before the signals are supplied to the synchronous detection circuits disposed at the next stage. The synchronous detection circuits 102a and 102b shown in FIG. 9 are composed of inverters 205a and 205b, analog switches 206a and 206b and other analog switches 207a and 207b. The analog switches 206a, 206b, 207a and 207b are operated by means of a synchronizing signal SYNC to alternately select non-inverted signals and inverted signals.

In another embodiment, a method of obtaining the product of the input signal and the AC component of the synchronizing signal SYNC by means of a four-phenomenon analog multiplier may be employed in place of the above arrangement.

The synchronously detected signals become direct currents (pulsating currents) and are supplied to the integration circuits 103a and 103b of the next stage.

Each of the integration circuits 103a and 103b consists of an operational amplifier 208a and 208b and a capacitor 210a and 210b. Currents which are proportional to the voltages of the synchronous detection outputs flow via resistors 209a and 209b to the capacitors 210a and 210b to be stored there. Then, these currents become integrated voltages and are produced from the operational amplifiers 208a and 208b. These voltages correspond to the voltages VA and VB mentioned in the foregoing. Analog switches 211a and 211b are arranged to make the electric charges stored at the capacitors 210a and 210b into their initial states. These electric charges stored at the capacitors 210a and 210b are thus cleared in response to a clear signal CLR from the control circuit 111 for a next electric charge storing process.

Figure 11:
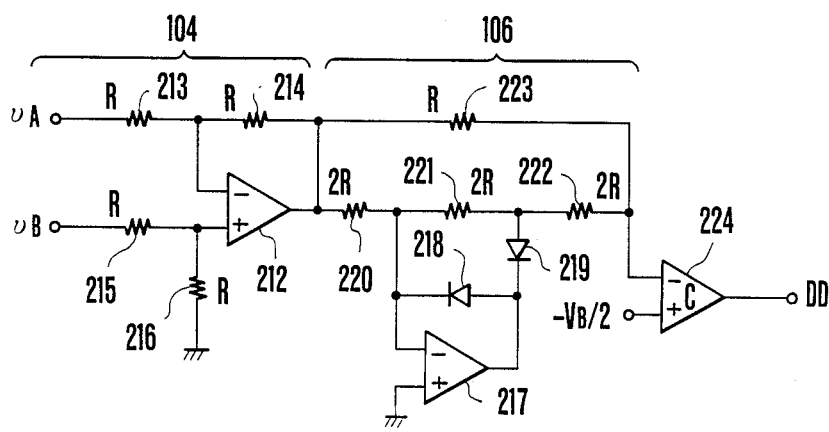
FIG. 11 is a circuit diagram showing the circuit arrangement of a part B of FIG. 9.

FIG. 11 shows in more detail the part B of the circuit of FIG. 9 wherein the integrated voltages VA and VB are processed to obtain a signal $|VA-VB|$ which is compared with the comparison voltage VD. The integrated voltages VA and VB produced from the integration circuits 103a and 103b are subjected to a subtraction process at a subtraction circuit 104 consisting of resistors 213–216 each of which is of the same resistance value R as an operational amplifier 212. A signal —VA+VB is obtained through this process. This value signal is applied to the absolute value circuit 106 of the next stage. The absolute value circuit 106 consists of an operational amplifier 217, diodes 218 and 219, resistors 220, 221 and 222 which are of a resistance value 2R and another resistor 223 which is of a resistance value R. The operational amplifier 217, diodes 218 and 219 and resistors 220 and 221 are so arranged that the cathode of the diode 219 comes to have a high impedance upon receipt of a negative input and to have a potential which is $-1$ times as high as an input voltage upon receipt of a positive input. As a result, a voltage of value $-0.5$ $|VA-VB|$ is applied to the negative input terminal of a comparator 224. With a voltage of value $-0.5$ VD having been applied to the positive input terminal of the comparator 224 beforehand, the value $|VA-VB|$ and the value VD are compared with each other. Let us assume that a value obtained as the result of this comparison is DD.

FIG. 12 shows in more detail the part C of the circuit of FIG. 9. The integrated voltages VA and VB are added up by resistors 225 and 226 of a resistance value R and a signal of a value 0.5 (VA+VB) is applied to each of the positive input terminals of comparators 227 and 228. Meanwhile, the negative input terminal of each of these comparators 227 and 228 has a signal of value 0.5 VL or 0.5 VH applied thereto. These comparators thus compare the value (VA+VB) with the values VL and VH and produce comparison outputs of values LL and HH respectively.

FIG. 13 shows in more detail the part D of the circuit of FIG. 9. In this part, the integrated voltages VA and VB are directly compared with each other by means of a comparator 229, which then produces a comparison output of a value AB.

FIG. 14 shows by way of example another method for obtaining the comparison value DD from the integrated voltages VA and VB. In this case, the voltages VA and VB are applied to the positive input terminals of comparators 230 and 231 and are further applied via resistors 232 and 233 of a resistance value R to the negative input terminals of these comparators 230 and 231. Meanwhile, these negative input terminals are also connected to constant current sources 234 and 235. Such being the arrangement, these negative input terminals have voltages VB+iR and VA+iR applied thereto respectively. (NOTE: "i" represents the current value of the constant current sources 234 and 235). The outputs of the comparators 230 and 231 are supplied to an OR circuit 236 which then produces the output (or the comparison value) DD. This output DD becomes true logic in case of $VA-VB>iR=VD$ or $VB-VA>iR=VD$ and represents logic in the event of $|VA-VB|>VD$.

Figure 15:
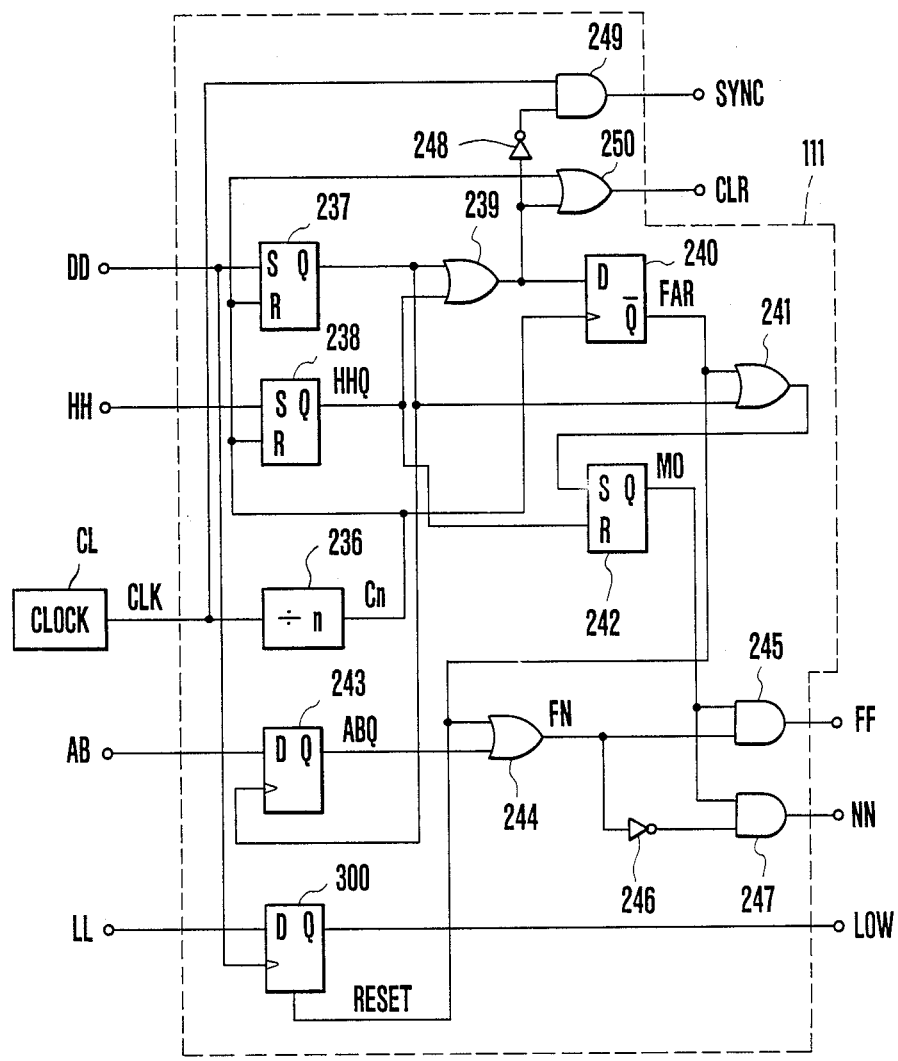
FIG. 15 shows the circuit arrangement of a sequence circuit 111 of FIG. 9.

FIG. 15 shows a case where a part of the sequence control circuit 111 is embodied by hardware means. A clock CL is arranged to determine the minimum period of the sequence control circuit 111 and serves as source of a signal for modulation of light emission of the light projecting element 4 and the synchronizing signal SYNC for the synchronous detection circuits 102a and 102b. A counter 236 is arranged to count an n-number and to produce an output Cn which determines the period and the maximum integration time for distance measurement. Flip-flops 237 and 238 are arranged to be set respectively by the signals DD and HH and to be reset by the signal Cn at every period of distance measurement. The outputs DDQ and HHQ of the flip-flops 237 and 238 are integration terminating signals. These signals DDQ and HHQ are supplied via an OR circuit 239 to a flip-flop 240 to be held there according to the period of the signal Cn. The inversion output $\bar{Q}$ of the flip-flop 240 becomes an infinity signal FAR. The signals FAR and DDQ come via an OR circuit 241 to set a flip-flop 242, which then produces a motor rotation signal MO. This flip-flop 242 is also arranged to be reset by the integration terminating or in-focus signal HHQ. When there obtains an in-focus state, the motor rotation signal MO is inhibited from being produced and the motor 8 is thus brought to a stop. The signal AB is renewed into a signal ABQ at a flip-flop 243 by the signal DDQ which represents an out-of-focus state. In this instance, the signal AB becomes true logic in the event of a near-focus state, i.e. in the case of VA>VB. The signals ABQ and FAR become a signal FN indicative of the rotating direction of the motor via an OR circuit 244. A final motor driving signal FF (in the direction of an infinity distance position) or NN (in the direction of a nearest distance position) is selected according to the output of an AND circuit 245 which receives the signals FN and MO or the output of an AND circuit 247 which receives the signal FN via a NOT circuit 246 and the signal MO.

In case that both the signals DDQ and HHQ are of false logic and are supplied via the OR circuit 239 and NOT circuit 248 to an AND circuit 249, the synchronizing signal SYNC is produced in synchronism with the output CLK of the clock CL which is supplied to the AND circuit 249 in that case. An integration resetting signal CLR produced from an OR circuit 250 becomes true logic and so remains until resumption of a next integrating process after termination of integration is decided jointly by the output of the OR circuit 239 and the signal Cn supplied to the OR circuit 250.

Figure 16:
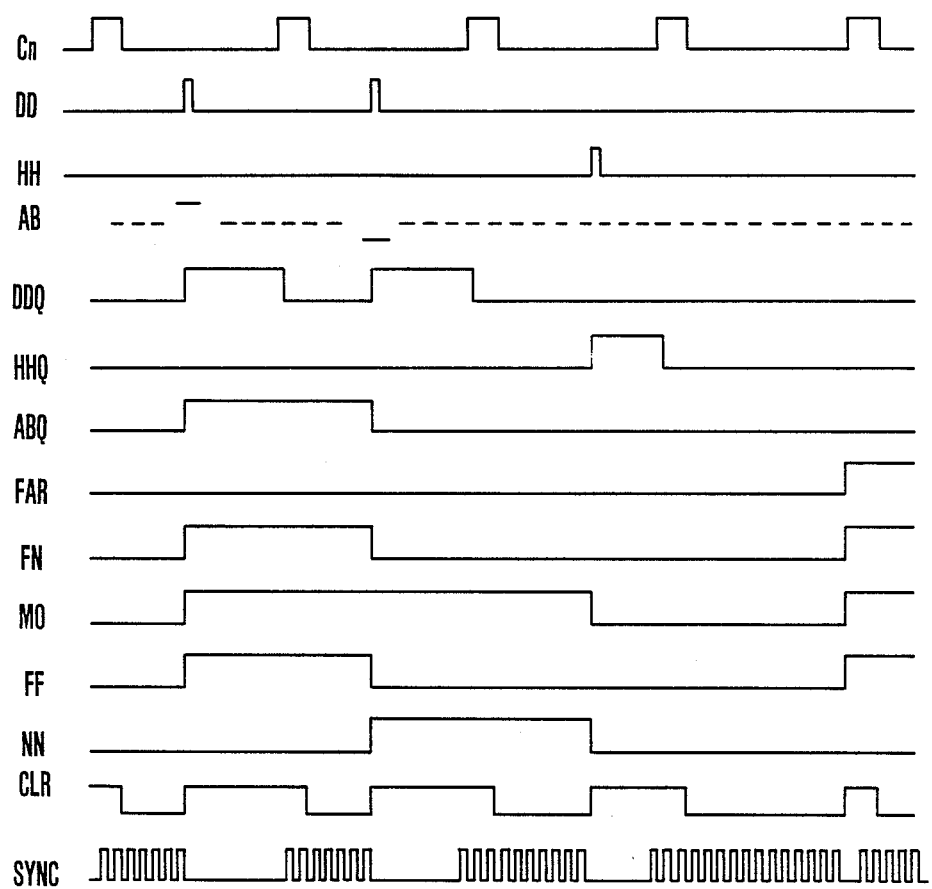
FIG. 16 is a wave form chart showing the wave forms of signals produced from various parts of the circuit arrangement shown in FIG. 9.

FIG. 16 shows wave forms of signals of FIG. 15 observed when focused state changes as follows: A near-focus state→a far-focus state→an in-focus state-→an infinity distance state. In the event of a near-focus state, the signal DD first rises. At this instant, the signal AB is at a high level. In the event of a far-focus state, the signal DD also first rises while the signal AB is at a low level. In case of an in-focus state, the signal HH rises. In case of an infinity distance state, the end of a maximum integration time comes before none of the signals come to rise.

Figure 17:
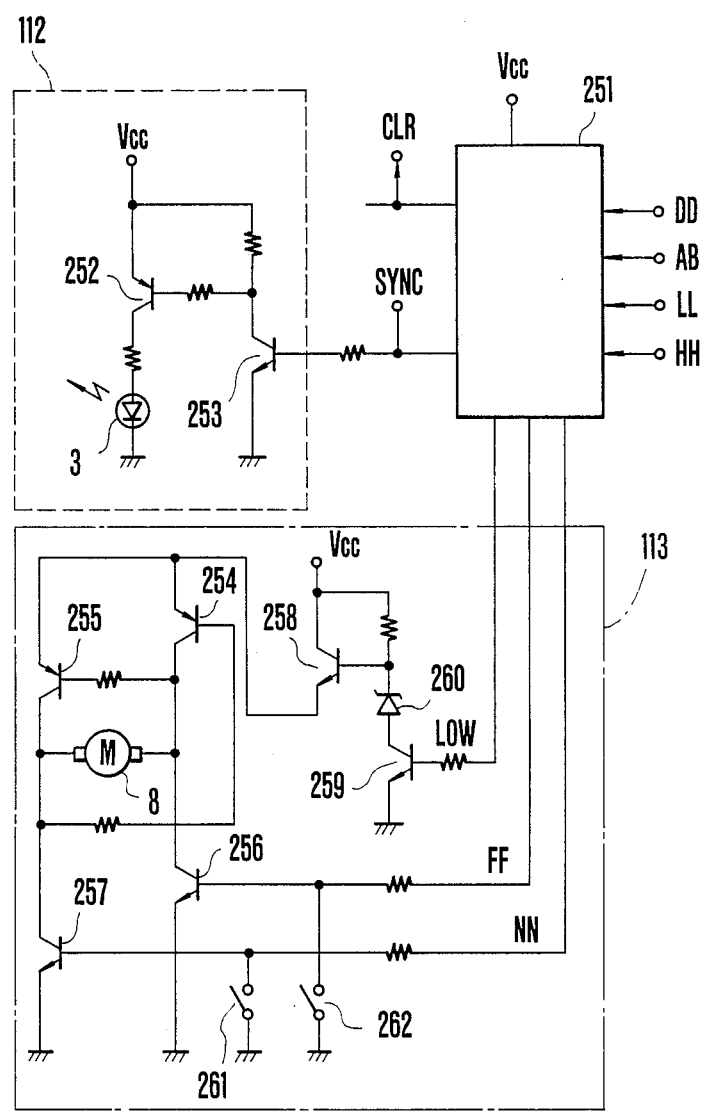
FIG. 17 is a circuit diagram showing the circuit arrangement of a light emission circuit 112 and that of driving means 113.
Figure 18:
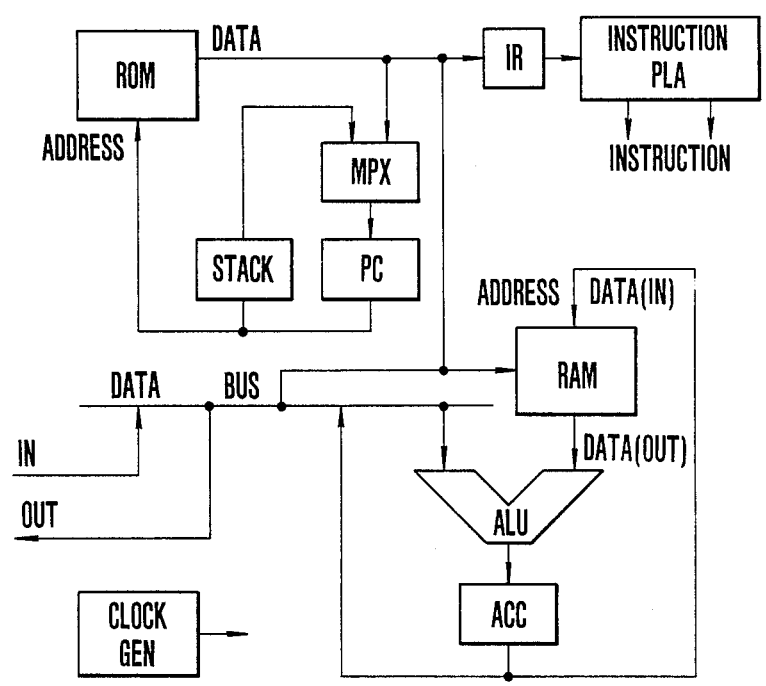
FIG. 18 is a block diagram showing micro-computer arrangement provided in case that a micro-computer is used for the circuit arrangement according to the invention.

FIG. 17 shows an example wherein a micro-computer is used for the sequence control circuit 111 to accomplish control with soft-ware arrangement employed in a part of the device according to the invention. In this drawing are also shown by way of example a light emission driving circuit 112 for the light projecting element 3 and a driving circuit 113 for the motor. A reference numeral 251 denotes the micro-computer, the inside of which is arranged, for example, as shown in FIG. 18. (The micro-computer may be selected from commercially available products such as a model No. MN 1453AX manufactured by Matsushita Electronics Industries Co., Ltd.) The input signals terminals of the micro-computer 251 receive the above-stated signals DD, AB, LL and HH. From the output terminals of the micro-computer are produced the signals SYNC, CLR, FF and NN. Further, a signal LOW for the motor rotation speed control, etc. can be readily added to these signals.

A current flowing to the light projecting element 2 is arranged to be switched by means of the signal SYNC via transistors 252 and 253. A current flowing to the motor 8 is switched by the signals FF and NN via transistors 254–257 to flow either in the forward or reverse direction. A voltage control circuit is formed by transistors 258 and 259 and a diode 260. The voltage impressed on the motor 8 is shiftable in two steps by means of the signal LOW. Reference numerals 261 and 262 denote respectively a nearest distance switch and an infinity distance switch. These switches 261 and 262 are arranged to close when the photo-taking optical system comes to the nearest and infinity distance end positions for preventing it from being driven further than these end positions.

Figure 19:
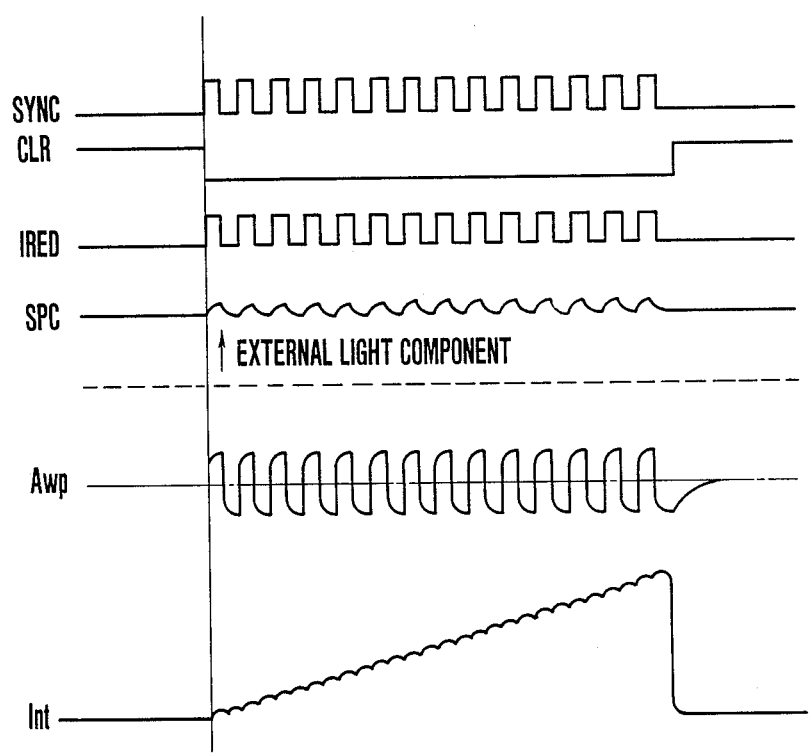
FIG. 19 is a wave form chart showing the wave forms of signals of circuits of FIG. 9.

FIG. 19 shows the wave forms of electrical signals of various parts of the circuit arrangement shown in FIG. 9. The synchronizing signal SYNC is applied to the synchronous detection circuits 102a and 102b. This signal is also used for driving the current of the light projecting element 3 to obtain a light emission output IRED. Meanwhile, the electrical signals obtained from the light receiving or photo-sensitive elements 6a and 6b come to show the wave form as represented by a signal SPC with an external light component such as sunlight or an artificial light superimposed on the reflection light component resulting from the projected infrared rays. A signal Amp is obtained by applying the signal SPC to amplifiers 101a and 101b which have a high-pass characteristic. When the signal CLR is removed at about the same time as commencement of light emission, the outputs of the synchronous detection circuits 102a and 102b are integrated. Then, in the outputs of the integration circuits 103a and 103b appears an integration wave form such as the one represented by a signal Int. The rate at which this integration wave form increases is proportional to the quantity of the reflection light component resulting from the projected infrared rays. Even in the event of a very weak input, a high S/N ratio can be obtained by allowing the integration process to be repeated sufficiently many times or to be carried on over a sufficiently long period of time.

Next, the operation of the device according to this invention will be described by step numbers with reference to the flow charts of FIGS. 20-24 based on the illustration of FIG. 9. In the following description, a micro-computer 251 (hereinafter will be called micom) is assumed to be used as the control circuit 111.

Step 1: The control circuit 111 begins to operate when an AF operation switch (not shown) is closed.

Figure 23:
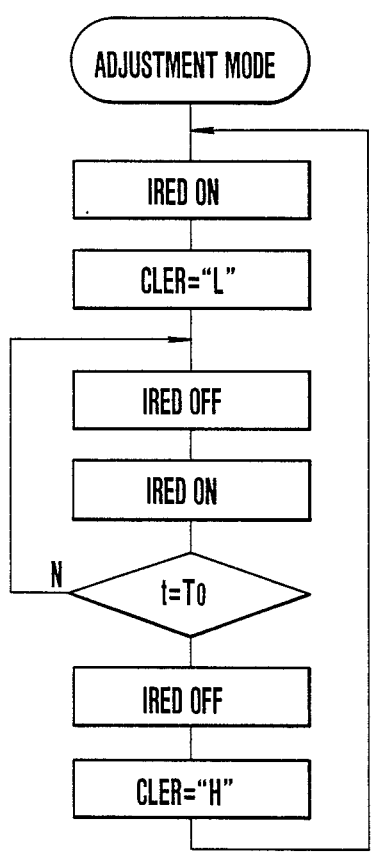

Step 2: First the input terminal SENS of the control circuit 111 is checked to find whether or not it is at a high level. If the input terminal SENS is at a high level, the operation is performed in an adjustment mode as shown in FIG. 23 and, in that event, no distance measurement action is performed. In the adjustment mode, the on-and-off action of the infrared ray emitting diode 3 is performed and the outputs of the light receiving element 6 are integrated over a period of time T0. The amplification circuits 101a and 101b for IC offset adjustment, the synchronous detection circuits 102a and 102b and the integration circuits 103a and 103b are adjusted. Further, the relative positions of the infrared ray emitting diode 3 or the light projecting lens 4, the light receiving element 6, the light receiving lens 7, etc. is adjusted. In case that the above-stated AF operation switch is closed when the input terminal SENS of the control circuit 111 is at a low level, the device first operates in an ordinary distance measurement mode in the following manner.

Step 3: In the ordinary distance measurement mode, a flag ∞ which is a signal indicative of whether the imaging optical system is in an infinity distance position or not and is employed as inhibiting means is reset. The flag (which is an infinity distance position indicating flag) can be formed with a flip-flop and an analog switch. When the imaging optical system comes to the infinity distance position, the switch operates to turn on the flip-flop. Then the set signal of the flip-flop brings this flag into a state of "1". A memory M(1) within the RAM region of the micom 251 is used as the memory for this flag.

Step 4: Following this, the control circuit 111 begins to perform a distance measuring action. First, the circuit 111 drives the light emission driving circuit 112 and the synchronous detection circuits 102a and 102b in synchronism with the synchronizing signal SYNC and, at the same time, releases the integration circuits 103a and 103b from a cleared state. Then, in synchronism with the synchronizing signal SYNC, a light spot image is projected with the infrared rays from the light projecting element onto the object. A reflection light flux resulting from this is received by the light receiving element 6. At the light receiving element 6, two photo-sensitive areas 6A and 6B produce electrical signals corresponding to the quantity of light received according to the received position of the reflected light spot image on the light receiving element 6. The electrical signals are amplified by the amplifiers 101a and 101b and are subjected to a synchronous detection process at the synchronous detection circuits 102a and 102b. The information signals thus obtained are gradually integrated respectively at the integration circuits 103a and 103b until the outputs of the integration circuits becomes integrated voltages VA and VB. The integrated voltages VA and VB are computed and processed, as mentioned in the foregoing, into the four digital information signals as described in the paragraphs (a)–(d) below and are supplied to the control circuit 111:

(a) A difference signal VA−VB is produced from the subtracter 104 and is applied to the absolute value circuit 106. The absolute value |VA−VB| thus obtained is compared by the comparator 107 with the comparison value VD. A result of this comparison is produced from the comparator 107 as a digital signal DD.

(b) A sum signal VA+VB obtained from the adder 105 is compared by the comparator 108 with the comparison value VL to obtain a digital signal LL.

(c) The sum signal VA+VB obtained from the adder 105 is compared by the comparator 109 with the comparison value VH (VH>VL) to obtain a digital signal HH.

(d) The values of the signals VA and VB are compared by the comparator 110 to obtain from the comparator 110 a digital signal AB.

Figure 25A:
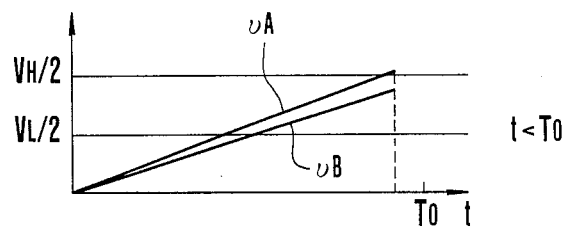
Figure 25B:
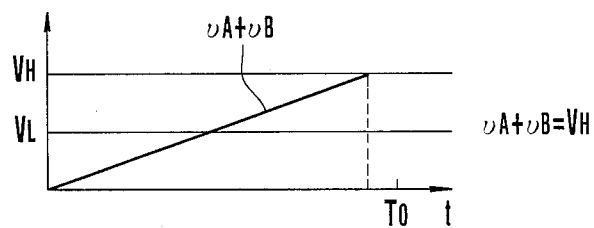
Figure 25C:
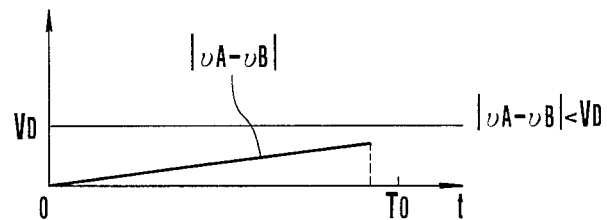
Figure 25D:
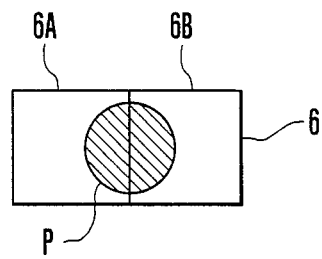
Figure 26A:
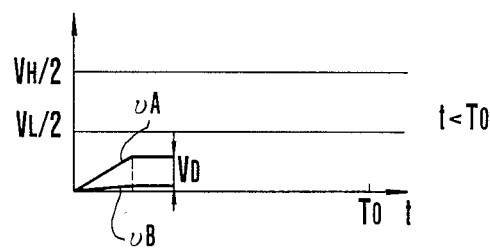
Figure 26B:
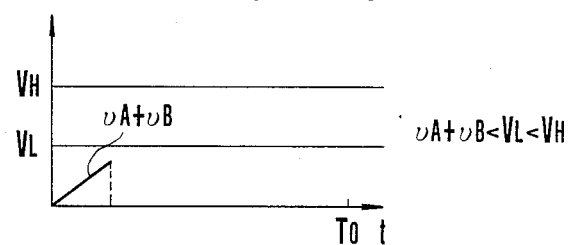
Figure 26C:
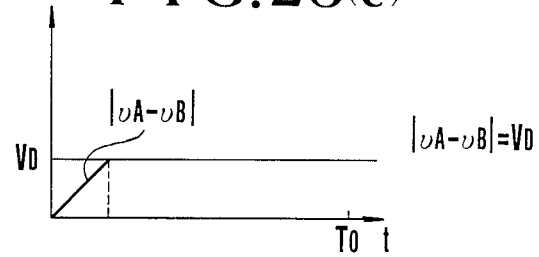
Figure 26D:
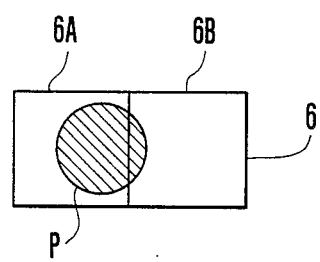
Figure 27A:
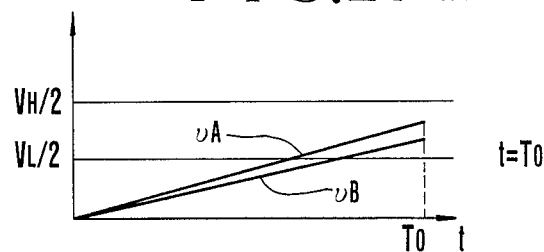
Figure 27B:
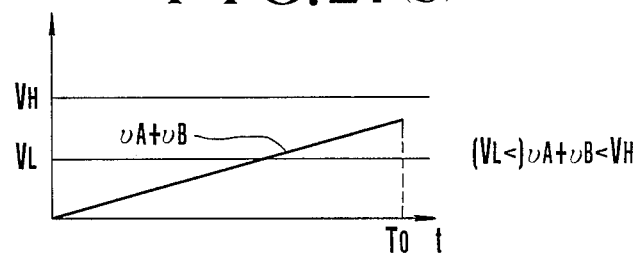
Figure 27C:
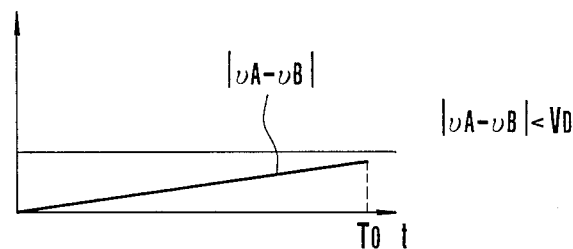
Figure 27D:
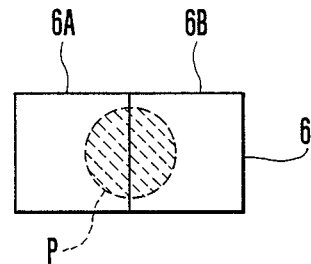
Figure 28A:
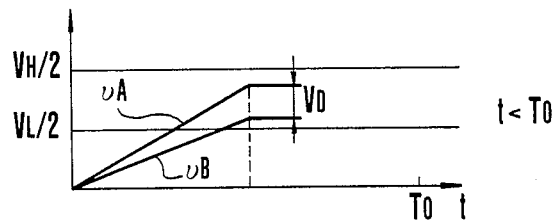
Figure 28B:
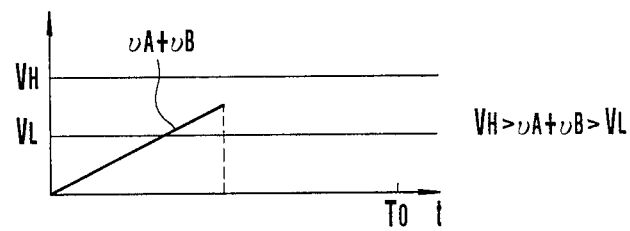
Figure 28C:
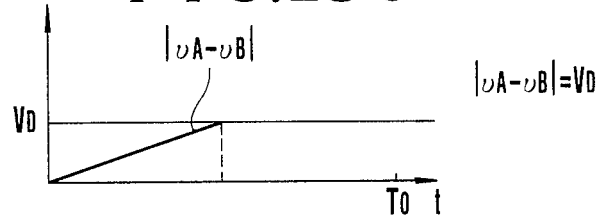
Figure 28D:
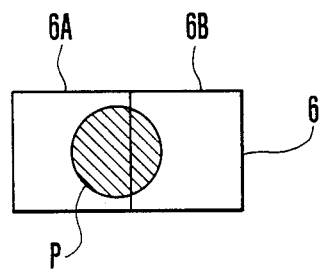
Figure 30A:
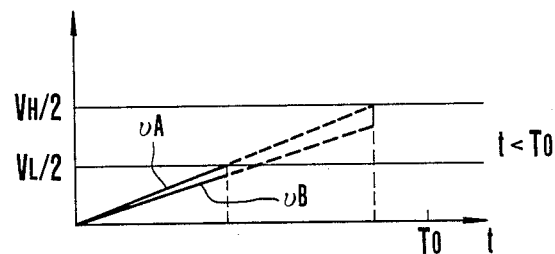
Figure 30B:
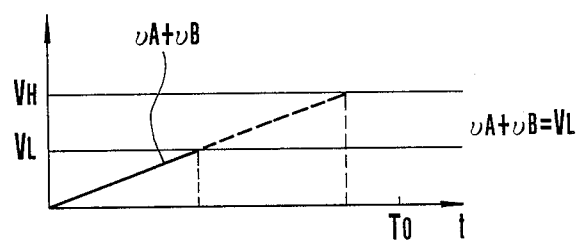
Figure 30C:
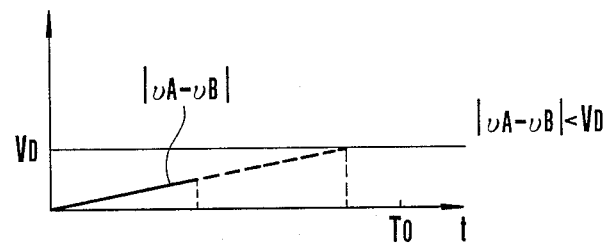
Figure 30D:
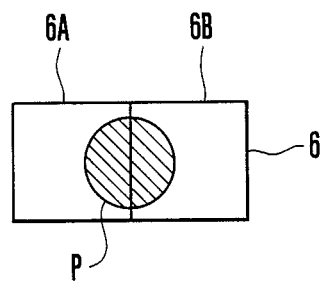

At the control circuit 111 on the other hand, time detecting means provided within the micom measures the signal integrating time of the integration circuits 103a and 103b, i.e. the projecting time of the light projecting element. Assuming that the integrating time is "t", the length of this time "t" is compared with a maximum integrating time T0 (28 msec, for example). With all the information signals mentioned above obtained, the control circuit 111 determines whether or not the following conditions have been obtained: $|VA-VB| \geq VD$ or $VA+VB \geq VH$ or $t \geq T0$. If any one of the above-stated three conditions is satisfied, the control circuit 111 judges the distance measuring action to have been completed. FIGS. 25(a), 25(b), 25(c) and 25(d) show the conditions of the reflected light spot image P and the integrated signals VA and VB obtained under an in-focus condition. Under the in-focus condition, the reflected light spot image P is formed at about a mid point between the photo-sensitive areas 6A and 6B of the light receiving element 6 as shown in FIG. 25(d). Under that condition, therefore, the photo-sensitive areas 6A and 6B produce outputs of about the same value. The values of the integrated signals VA and VB thus become about equal to each other and increase rapidly as shown in FIG. 25(a). This causes the signal VA+VB to also rapidly increase with time "t" as shown in FIG. 25(b). Meanwhile, the signal |VA−VB| does not much increase as shown in FIG. 25(c). Therefore, an in-focus state is judged to have been attained when these signals in comparison with the comparison values VH and VD are in the states of $VA+VB \geq VH$ and $|VA-VB| < VD$ for the maximum integration time T0 and if the time "t" is in a condition of "t" < the maximum integration time T0. FIGS. 26(a), 26(b), 26(c) and 26(d) show the reflected light spot image obtained in the case of an out-of-focus state and the conditions of the integrated signals VA and VB. In the event of a near-focus state or a far-focus state of the lens group 1, the reflected light spot image P deviates from the mid point either toward the photo-sensitive area 6A or toward the other area 6B of the light receiving element 6 as shown in FIG. 26(d). In that event, one of the output signals of the photo-sensitive areas 6A and 6B generally becomes greater than the other. Therefore, as shown in FIG. 26(b), one of the integrated signals VA and VB rapidly increases with the time "t" while the value of the other little increases. Therefore, as shown in FIGS. 26(b) and 26(c), the signal |VA−VB| becomes $|VA-VB| \geq VD$ before the signal VA+VB becomes larger than the comparison value VH and the integration time "t" reaches the maximum integration time T0. Accordingly, the lens group is judged to be either in a near-focus state or in a far-focus state when a condition of $|VA-VB| \geq VD$ is detected under a condition of VA+VB<VH and "t"<T0. FIGS. 27(a), 27(b), 27(c) and 27(d) show the reflected light spot image P and the conditions of the integrated signals VA and VB either when the object to be photographed is located at a long distance or when the reflection factor of the object is extremely low. In this instance, the reflected light spot image P either not formed on the light receiving element 6 or formed with a very little received light quantity. Therefore, the values of the output signals of both the photo-sensitive areas 6A and 6B are small. The integrated signals VA and VB therefore do not much increase as shown in FIG. 27(a). As a result, both the signals VA+VB and |VA−VB| do not become $VA+VB \geq VH$ and $|VA-VB| \geq VD$ even when the integration time "t" reaches the maximum integration time T0 as shown in FIGS. 27(b) and 27(c). Accordingly, the object is judged to be at a long distance or in a hardly distance measurable state when there obtains a condition of $t \geq T0$, VA+VB<VH and |VA−VB|<VD.

With the condition of $VA+VB \geq VH$ or $|VA-VB| \geq VD$ or $t \geq T0$ arranged to be a condition for determining completion of distance measurement as mentioned above, an automatic focal point detecting operation can be promptly initiated when the integrated signals VA and VB reach distance measurable values and thus wasteful consumption of electric charge can be effectively prevented. Particularly, in the case of this device as will be further described later, the length of time for each distance measuring cycle is arranged to be unvarying with the maximum integration time T0 counted within the micom and with a next distance measuring cycle arranged to begin for resumption of distance measurement after the lapse of the time T0. This arrangement completely eliminates wasteful consumption of electric energy during the period after completion of distance measurement and before the lapse of the time T0. This is a great advantage for saving electric energy.

Figure 24:
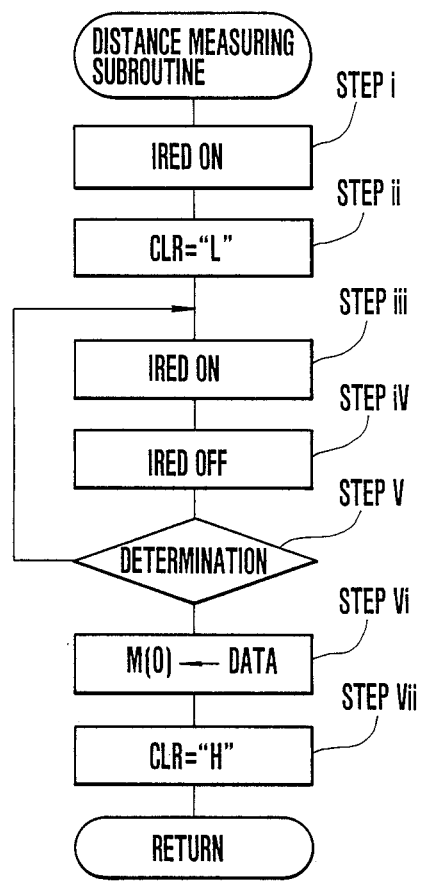

FIG. 24 shows as subroutine the details of the above step 4. The step 4 consists of the following sub-steps:

Step i: The light projecting element 3 and other distance measurement circuits begin to operate in the manner as described in the foregoing.

Step ii: The integration circuits 103a and 103b are released from a cleared state.

Step iii: The light projecting element 3 performs light emission.

Step iv: Following that, the synchronizing signal SYNC is stopped to stop thereby the light emission driving circuit 112 and thus to bring the light emission of the light projecting element 3 to a stop. At the same time, the operation of the synchronous detection circuits 102a and 102b is also stopped.

Step v: Completion or no completion of distance measurement is judged according to the above-stated condition for determining completion of distance measurement. If the condition for determining completion of distance measurement has not been satisfied, distance measurement is resumed by again causing the light projecting element 3 to perform the light emitting action.

Step vi: In case that the condition for determining completion of distance measurement is satisfied, the signals DD, AB, LL and HH which are outputs of the comparators 107, 108, 109 and 110 are stored at a memory M(0) within the RAM area of the micom. The synchronizing signal SYNC is then stopped to bring the operation of the light emission driving circuit 112 to a stop. The light projecting element 3 stops the light emission and, at the same time, the synchronous detection circuits 102a and 102b also stop operating.

Step vii: The level of the output CLEAR of the control circuit 111 is caused to become high to clear the integration circuits 103a and 103b for a next distance measuring operation. After completion of the above-stated series of control actions, a four bit datum stored at a memory M(0) is used for an automatic focus detecting operation and a shift to other distance measuring modes which will be described later. Further, in the subroutine of FIG. 24, the condition for determining completion of distance measurement at the step v may be changed to permit the subroutine to become applicable to other distance measurement modes.

Step 5: Again referring to FIG. 20, an in-focus state is determined to have been attained when the condition of $VA+VB \geq VH$ is detected.

Step 6: Upon determination of the in-focus state, the control circuit 111 produces a stop signal (FF=NN=0) which is supplied to the motor driving circuit 113 to bring the motor 8 to a stop.

Step 7: After the integration time "t" reaches the maximum integration time T0, the operation shifts to an ordinary in-focus distance measuring mode suited for an ordinary in-focus state and distance measurement is resumed. The term "ordinary in-focus distance measuring mode" means a mode in which distance measurement is repeated after a signal indicative of an in-focus state has been attained with distance measurement carried out in the previous distance measuring mode.

Step 8: In case that the condition of $VA+VB \geq VH$ is not obtained, either there obtains an out-of-focus state or the values of the integrated signals VA and VB are too small. At the step 8, it is determined which of the two applies to the case. In this case, if the condition of $|VA-VB| \geq VD$ is not obtained, the distance measurement is completed at a point of time $t \geq T0$. Therefore, in that event, the integrated signals VA and VB are at low levels as mentioned in the foregoing. Therefore, distance measurement is carried out in a manner suited for the low level integrated signals VA and VB. In other words, the operation shifts to a low level distance measuring mode which will be described later herein.

Step 9: In the event of $|VA-VB| \geq VD$, the lens group 1 is determined to be in an out-of-focus state. The lens group is then determined whether it is in a near-focus state or in a far-focus state. It is determined to be in a far-focus state when the integrated signals are in a relation of $VA>VB$. Then, it is decided that the motor 8 must be driven to shift the lens group 1 toward the nearest distance position thereof.

Step 10: Next, a motor driving speed is determined. In the case of this specific embodiment, the motor speed is arranged to be controlled in two steps. When the lens group 1 approaches an in-focus state from the out-of-focus state, the motor speed is shifted to a lower speed to prevent the lens group 1 from overrunning an in-focus position by bringing it smoothly to a stop. The motor speed may be arranged to be shiftable in any desired number of steps. For determining whether the position of the lens group 1 is close to the in-focus position or greatly deviating from the in-focus position, the level of the comparison value VL is used as determining reference. In the event of an out-of-focus state, the lower motor speed is selected if the signal VA+VB is in the condition of $VA+VB \geq VL$ when distance measurement is completed, i.e. at the point of time when the condition of $VA-VB=VD$ is attained and a higher speed is selected if the signal VA+VB is in a condition of $VA+VB<VL$ at that point of time. The details of this are as shown in FIGS. 26(a), 26(b), 26(c) and 26(d) and FIGS. 28(a), 28(b), 28(c) and 28(d). FIGS. 26(a), 26(b), 26(c) and 26(d) show the operation at the high motor speed and FIGS. 28(a), 28(b), 28(c) and 28(d) the operation at the low motor speed. As will be understood from these drawings, the reflected light spot image P comes closer to a mid point between the photosensitive areas 6A and 6B of the light receiving element 6 according as the lens group 1 comes closer to the in-focus state. The difference in level between the integrated signals VA and VB thus becomes smaller accordingly. Therefore, the length of the time "t" required before the condition $|VA-VB| \geq VD$ is obtained becomes longer according as the lens group 1 comes closer to the in-focus position. The value of the signal VA+VB increases in proportion to the increase in the length of the time "t". Accordingly, the extent of deviation of the focused state of the lens group 1 can be found from the value of the signal VA+VB. The relation of control over the speed of the motor 8 to the position of the reflected light spot image P on the light receiving element 6 is as shown in FIGS. 29(a) and 29(b). The quantities of light received at the photo-sensitive areas 6A and 6B during the process of shifting the reflected light spot image P from a point P1 (a far-focus point) to a point P3 (a near-focus point) via a point P2 (an in-focus point). In FIG. 29(b), a part L represents a low motor speed applying range, which can be expressed as follows:

$$\frac{|VA - VB|}{VA + VB} \leq ko$$

The value of ko can be set at a suitable value according to the conditions such as the speed of the motor and the inertia of the system. Then, there obtains the following relation:

$$\frac{VA - VB}{VA + VB} \leq ko \rightleftarrows VA + VB \geq \frac{VA - VB}{ko} + VL$$

In this device, completion of distance measurement in the event of an out-of-focus state is determined when there obtains a condition of $|VA - VB| = VD = $ a predetermined voltage. The motor control is accomplished by setting a condition of $VD/ko = VL'$. In the case of this specific embodiment, the values VL and VL' are arranged to be $VL = VL'$. However, they may be set at different values.

Figure 20:
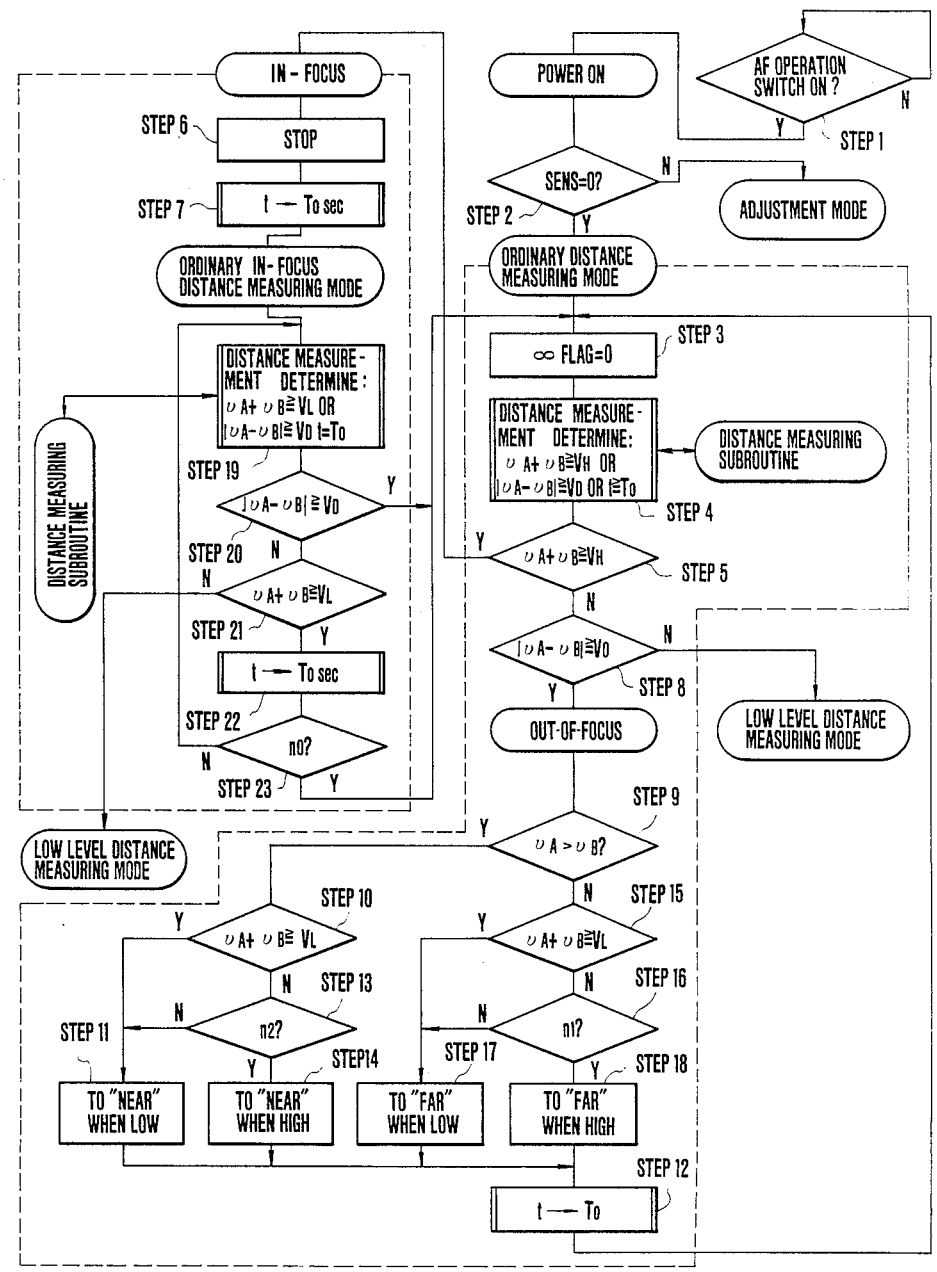
FIGS. 20 through 24 are flow charts showing the operations of the automatic focus detecting device according to the invention under various distance measuring conditions.

Referring once again to the flow chart of FIG. 20, after a far-focus state is determined under an out-of-focus condition, determination of a condition $VA + VB \geq VL$ is carried out.

Step 11: In the case of $VA + VB \geq VL$, the control circuit 111 produces a signal for driving the motor 8 at a low speed as mentioned in the foregoing. With this signal produced, the lens group 1 is shifted toward the nearest distance position.

Step 12: After the integration time "t" reaches the maximum integration time T0, the operation comes back to the step 3 and distance measurement is performed again in the ordinary distance measurement mode.

Step 13: In the event of $VA + VB < VL$ at the step 10, the motor 8 should be caused to rotate at a high speed as a general rule as mentioned in the foregoing. However, at this step 13, determination is carried out to find whether or not a decision to drive the motor toward the nearest distance side has been continuously repeated at least n2 times while the operation of the ordinary distance measuring mode is repeated n2 times. If it has been repeated less than n2 times, the operation comes back to the step 11 to cause the motor 8 driven toward the nearest distance side.

Step 14: In case that the decision to drive the motor toward the nearest distance side at a high speed has been continuously repeated at least n2 times, the motor 8 is driven at the high speed toward the nearest distance side. If this decision is not continuously repeated n2 times and, for example, an in-focus state or the like is determined halfway during the process of the repeated decision, the motor 8 is not allowed to be rotated at the high speed until the decision to drive it toward the nearest distance side at the high speed is repeated n2 times.

As mentioned in the foregoing, the purpose of controlling the speed of the motor lies in that: With the motor 8 arranged to move always at a low speed at the start, the arrangement not only improves an initial feeling but also mitigates such undesirable happenings as the hunting of the lens group 1 that result from noises superposed on the integrated signals VA and VB. As for the operation at steps 15–18, the operation is exactly the same as that of the steps 10–14 except that the motor driving direction of the former is reverse to that of the latter and thus requires no further description.

Step 19: With an in-focus state determined at the step 5, when the integrating time "t" reaches the maximum integration time T0, distance measurement is resumed in the ordinary in-focus distance measurement mode suited for distance measurement after attainment of an in-focus condition. This is necessary because: Even after the attainment of an in-focus state, the object to be photographed might move any moment to change a distance thereto. In view of this possibility, the in-focus state must be confirmed by repeating distance measurement at every predetermined time intervals, which is the maximum integration time T0 in this case. In the ordinary in-focus distance measuring mode, a condition for determining termination of distance measurement is as follows: The condition for determining an in-focus state which is $VA + VB \geq VH$ in the ordinary distance measuring mode is replaced by a condition $VA + VB \geq VL (VL < VH)$. The reason for changing the condition for determining or deciding to terminate distance measurement from $VA + VB \geq VH$ to $VA + VB \geq VL$ is to broaden a range in which the lens group 1 can be regarded as in an in-focus position. In other words, the so-called dead band within which the lens group 1 cannot be determined as in an out-of-focus state is broadened for the purpose of preventing the lens group 1 from being too readily shifted from the position which has been determined to be an in-focus position. For example, if the condition is set to be $VL = \frac{1}{2} VH$, substantially the same effect as increasing the comparison value VD by two times can be obtained as shown in FIGS. 30(a), 30(b), 39(c) and 30(d). Then, by this arrangement, the condition of $|VA - VB| \geq VD$ cannot be readily determined for determination of an out-of-focus state. Accordingly, this arrangement reduces the possibility of an erroneous action due to a noise superposed on the integrated signals VA and VB. Further, the integration time, i.e. the light emitting time of the light projecting element 3 can be shortened by lowering the comparison value. For this specific embodiment which is arranged to have the distance measuring cycle fixed at a predetermined length of time, this gives an additional advantage in terms of power consumption.

Other distance measurement completion determining conditions are the same as in the case of the ordinary distance measuring mode and the operation after that is performed in the same manner as in the case of the ordinary distance measuring mode. In other words, when one of the three conditions $|VA - VB| \geq VD$, $VA + VB \geq VL$ and $t \geq T0$ is satisfied after commencement of distance measurement, the control circuit 111 brings distance measurement to an end. Then, the comparison signals DD, AB, LL and HH which are obtained at that time is again stored at the memory M(0).

Step 20: Whether or not the condition $|VA - VB| \geq VD$ is obtained, that is, whether the lens group 1 is in an out-of-focus state is determined on the basis of the data stored at the memory M(0) in the step 8. In the event of $|VA - VB \geq VD$, the lens group 1 is out of focus. The operation then comes back to the step 3 again to perform distance measurement in the ordinary distance measuring mode.

Step 21: In case that the condition of $|VA - VB| \geq VD$ is not obtained, either the lens group 1 is in-focus or the object is located too far or its reflection factor is too low to obtain sufficient signals. In this event, the levels of the integrated signals VA and VB is determined according to the presence or absence of the condition of $VA+VB \geqq VL$. Whether the lens group 1 is in-focus or not is determined according to the result of this. If the integrated signals are not in the condition of $VA+VB \geqq VL$, distance measurement is terminated under the condition of $t \geqq T0$. In that instance, since the levels of the integrated signals VA and VB are extremely low, the object is determined as locating at a long distance or to have a low reflection factor and the operation shifts to the low level distance measuring mode to resume distance measurement in that mode.

Step 22: In case that an in-focus state is determined under the condition of $VA+VB \geqq VL$, a counting process is performed up to the maximum integration time T0 in the same manner as the manner described with reference to the step 7.

Step 23: Following that, determination is made to find how many times distance measuring process in the ordinary in-focus distance measuring mode is repeated. In case of the number of repeated times $n < n0$, the operation comes back to the ordinary in-focus distance measuring mode to perform distance measurement in that mode until a condition of $n = n0$ is obtained or comes back to the step 20 or 21 to perform distance measurement in the ordinary infocus distance measuring mode until it shifts to another distance measuring mode. When the process of the ordinary in-focus distance measuring mode is repeated n0 times to reach the condition of $n = n0$, the operation comes back to the ordinary distance measuring mode (step 3). Then, a next process of distance measurement is performed in the ordinary distance measuring mode, which is to be carried out with a normal dead band.

As mentioned above, the dead band is shifted back to the normal state every time the process of distance measurement is repeated n0 times, so that distance measurement accuracy can be prevented from degrading. As has been mentioned at the step 19, arrangement to broaden the dead band enhances the stability of operation. However, such arrangement tends to result in a lower distance measurement accuracy. In view of this, the operation is brought back to the ordinary distance measuring mode every time distance measurement is repeated n0 times to have the determination of an in-focus or out-of-focus state carried out with the dead band brought back to its normal state. Therefore, the distance measuring accuracy can be prevented from lowering. Thus, according to the arrangement of this embodiment, stabilization of the focused state and the accuracy of distance measurement become compatible. Further, the values of n0 and VL must be set at suitable values for the above-stated purpose.

Figure 21:
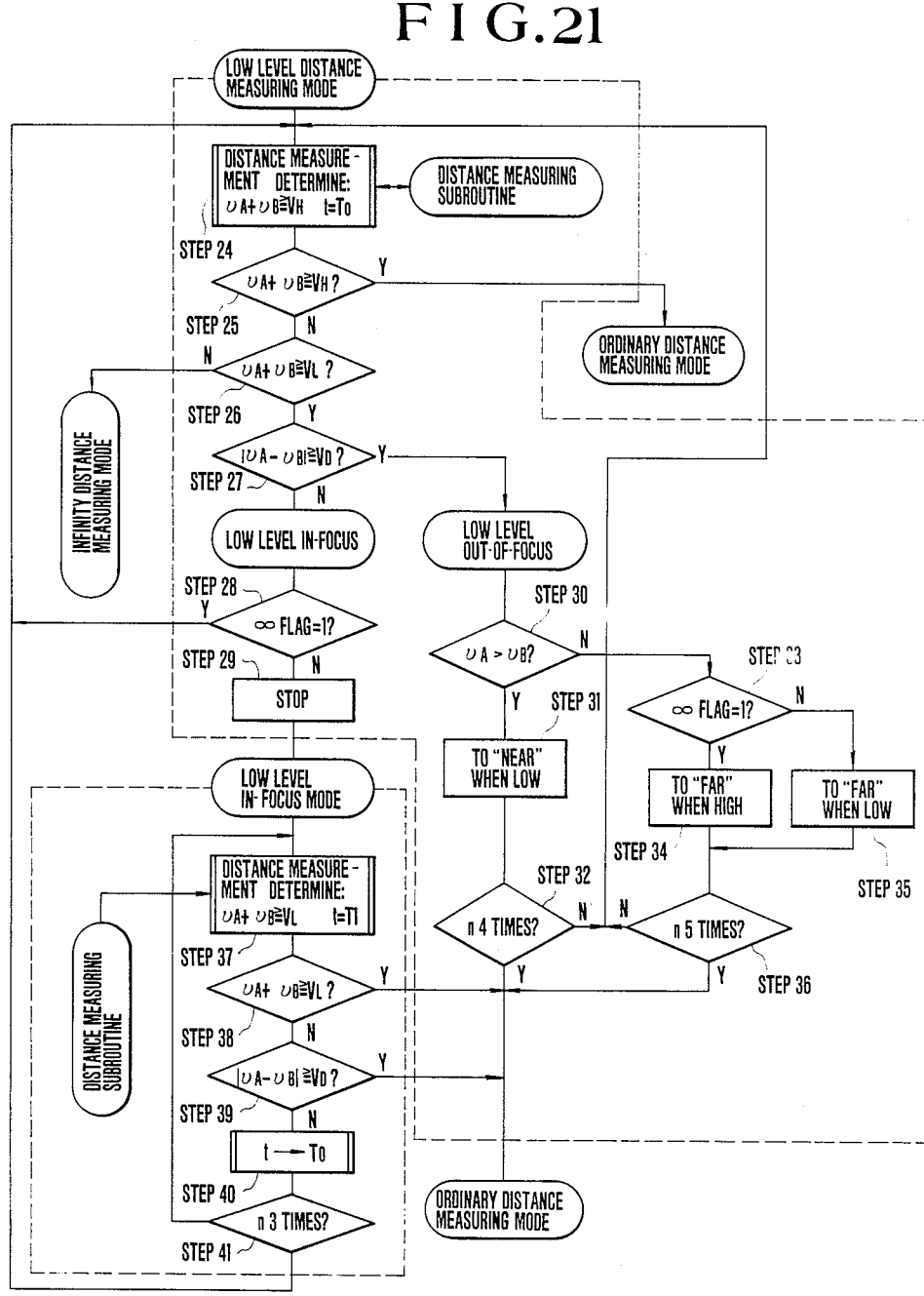

Referring now to FIG. 21, the distance measuring operation of the embodiment under a low level condition is as follows:

Step 24: Distance measurement is performed in a low level distance measuring mode in the following cases: Both the integrated signals VA and VB are determined to be at low levels in the ordinary distance measuring mode or the ordinary in-focus distance measuring mode as mentioned in the foregoing; and the levels of the integrated signals VA and VB are determined to have become sufficiently high for distance measurement during the process of an infinity distance measuring mode which will be described later. The low level distance measuring mode is suited to distance measurement when the levels of the integrated signals VA and VB are low. In the low level distance measuring mode, distance measurement is determined to be completed when the condition of the integrated signals VA and VB becomes $VA + VB \geqq VH$ or when the condition of $t \geqq T0$ is obtained in the same manner as in the ordinary distance measuring mode. However, unlike the ordinary distance measuring mode, the conditions for determining completion of distance measurement in this case exclude the condition of $VA - VB \geqq VD$. The reason for this difference is as follows: In the case of the low level distance measuring mode, the object 5 is either located at a long distance or has a low reflection factor; accordingly, the signal levels detectable on the light receiving element 6 are low; and this results in the poor S/N ratio of the integrated signals VA and VB. In some extreme cases, therefore, the largeness and smallness relation between the integrated signals VA and VB becomes reverse to the actual relation due to a noise. The low level distance measuring mode is arranged to prevent any erroneous distance measurement under such a condition. In other words, with signals indicative of near and infinity distance directions repeatedly produced, if these signals are detected as they are, out-of-focus signals of opposite directions would be alternately produced to make the operation of the device unstable. FIGS. 31(*a*), 31(*b*) and 31(*c*) show examples of the integrated signals of such poor S/N ratios. The signals VA and VB alternately change their places as depicted in FIG. 31(*a*). Therefore, when a condition of $|VA - VB| \geqq VD$, VB > VA obtains at a point (I) as shown in FIGS. 31(*a*) and 31(*c*), the lens group 1 is determined to be in a near-focus state. Then, the control circuit 111 would produce a control signal to drive the motor 8 in the infinity distance direction. Further, the relation between the integrated signals which is VB > VA at the point (I) happens to be $|VA - VB| < VD$ as shown at (I'), no determination of distance measurement would be performed at the point (I) and a condition of VA > VB, $|VA - VB| > VD$ would be determined at another point (II). Then, as a result of this, an out-of-focus signal of the direction completely opposite to the above-stated signal would be produced to the motor 8. To minimize such unstableness, the low level distance measuring mode is arranged not to use the condition of $|VA - VB| \geqq VD$ for determining completion of distance measurement. When the condition of $VA + VB \geqq VH$ is not determined, the integration time "t" is allowed to reach the condition of $t = T0$. After that, the condition of $|VA - VB| \geqq VD$ is determined.

With a plurality of modes selectively employed in the above-stated manner, both the advantage (power saving, etc.) of the ordinary distance measuring mode and the stabilizing advantage of the low level distance measuring mode can be compatibly attained.

Step 25: Again referring to the flow chart of the low level distance measuring mode of FIG. 21, determination is made to find whether or not the distance measurement is completed under the condition of $VA + VB \geqq VH$ after completion of distance measurement at the step 24. This condition $VA + VB \geqq VH$ means a sufficiently large value of the integrated signals VA and VB. If the result of this determination is in the affirmative, the operation comes back to the ordinary distance measuring mode of the step 3. FIGS. 32(*a*), 32(*b*) and 32(*c*) show the conditions of the signals VA, VB, VA + VB and $|VA - VB|$ which obtain when the operation shifts from the low level mode to the ordinary distance measuring mode. Referring to FIG. 32(c), the distance measurement does not terminate when the condition of $|VA-VB|>VD$ is obtained and is carried on. The distance measurement terminates when the condition of $t<T0$, $VA+VB \geq VH$ is satisfied as shown in FIG. 32(b) and then the operation comes back to the ordinary distance measuring mode.

Step 26: Any condition other than the condition of $VA+VB \geq VH$ means that the distance measurement is terminated under the condition of $t=T0$. The level of the signal $VA+VB$ is continuously determined for the purpose of finding whether the object to be photographed is located at an infinity distance or at a finite distance which is measurable. A condition other than the condition of $VA+VB \geq VL(VL<VH)$ indicates very low levels of the signals VA and VB and that the object is at an infinity distance. In the event of this condition, the subsequent operation is performed in the infinity distance measuring mode which will be described later. FIGS. 33(a), 33(b) and 33(c) show the conditions of the signals VA, VB and VA+VB when the operation is shifted to the infinity distance measuring mode. When a condition of $VA+VB<VL$ is obtained after distance measurement is carried on until the integration time "t" reaches the maximum time T0, the levels of both the signals VA and VB are very low. The object distance then may be considered to be an infinity distance. In that event, the value of the signal $|VA-VB|$ is disregarded irrespective as to whether it is in a condition or $|VA-VB| \geq VD$ or $|VA-VB|<VD$. Further, in case that the object is not located at an infinity distance but has a low reflection factor, the object also gives only an insufficient reflection light and thus results in the same condition as the one mentioned above. However, in the case of this embodiment which is of the type performing distance measurement by means of light projecting and light receiving systems, it is extremely difficult to distinguish a distant location of the object from its low reflection factor. In the case of this embodiment, therefore, the above-stated condition is considered to be attributable to the distance location of the object. Accordingly, the control circuit 111 produces a control signal (FF=1, NN=0) to the motor driving circuit 113 for driving the motor 8 in the infinity distance direction. If some other distance measurement signal is produced before the photo-taking lens 1 reaches the infinity distance end position, a motor stopping or reversing signal is of course applied to the motor driving circuit at such a point of time.

Step 27: At the time of $VA+VB \geq VL$, that is, when the signal $VA+VB$ is in a condition of $VL \leq VA+VB<VH$, determination is made to find whether or not there obtains a condition of $|VA-VB| \geq VD$. In the event of $|VA-VB|<VD$, an in-focus state is determined to be obtained under a low level condition. In the event of $|VA-VB| \geq VD$ as shown in FIGS. 34(a), 34(b) and 34(c), an out-of-focus state is determined to be obtained under a low level condition. In such a case, as a general rule, the motor is rotated at a low speed in the focusing direction.

Step 28: In the event of $|VA+VB| \geq VD$, an infocus state is determined to have been obtained under a low level condition as mentioned in the foregoing and a motor stopping signal is produced from the control circuit 111. However, as an exception to this, this motor stopping signal is not produced in case of a ∞ flag=1. The ∞ flag is set at "1" at the time of the above-stated shift to the infinity distance (∞) measuring mode and is reset at "0" in the ordinary distance measuring mode. With the ∞ flag set at "1", the control circuit 111 produces the same control signal to the motor driving circuit 113 as before. The condition of ∞ flag=1 obtains in the low level distance measuring mode only when the infinity distance measuring mode is shifted to the low level distance measuring mode. In that event, a signal is produced to cause the motor to rotate in the infinity distance direction. Therefore, in the event of ∞ flag=1, the motor 8 continues to shift the lens group 1 toward its infinity distance position even when an in-focus state is determined to have been obtained under a low level condition. The reason for the provision of ∞ flag=1 as an exception is as follows: In the case of a focusing operation on an object which is either located at such a long distance or has such a low reflection factor that results in a low level in-focus signal, if the distance measurement begins from a lens position greatly deviating toward the nearest distance position from an in-focus position, the leak current of the light receiving element 6 tends to cause a false in-focus signal to be produced before completion of a focusing process. The possibility of such an error has been confirmed through experiments. If the motor is stopped from rotating by such a false signal, the lens group 1 might come to a stop in a position greatly deviating from an in-focus position. The ∞ flag is provided for distinguishing such a false signal. In the case of ∞ flag=1, the control circuit 111 continues to produce the signal of the infinity distance direction while distance measurement is allowed to be carried on in the low level distance measuring mode as mentioned in the foregoing.

Step 29: In the event of ∞ flag=0, the control circuit 111 produces the motor stopping signal in a normal manner to bring the motor 8 to a stop.

Step 30: In case of $|VA-VB| \geq VD$ at the step 27, an out-of-focus state is determined to be obtained under a low level condition. Then, determination is made to find the defocused direction, i.e. to find whether the integrated signals are in the condition of $VA>VB$.

Step 31: The relation $VA>VB$ between the integrated signals VA and VB indicates a far-focus state. In that event, a decision is made to have the control circuit 111 cause the motor 8 to shift the lens group 1 toward the nearest position. In the low level distance measuring mode, the motor as a general rule rotates at a low speed, because: Under a low level condition, the values of both the integrated signals VA and VB are small and the S/N ratio is low. Therefore, no sufficiently reliable direction signal can be obtained. However, with the motor caused to rotate at a low speed, the unstable action of the lens group 1 such as hunting can be moderated.

Step 32: Next, determination is made to find whether or not the far-focus state under the low level condition is continuously and repeatedly determined n4 times. Then, when a signal of one and the same direction is found to have been repeatedly obtained n4 times, it is determined that the S/N ratio of the signal VA and VB has become sufficiently high and the operation comes back to the ordinary distance measuring mode. After that, distance measurement is performed in a power saving manner in the ordinary distance measuring mode. The distance measurement is terminated when there obtains the condition of $|VA-VB| \geq VD$ and reposes till the integrating time reaches the maximum time T0. Then, with determination made after integration up to the end of the maximum time, the stability of the operation in the low level distance measuring mode can be attained compatibly with the power saving effect.

Step 33: If the integrated signals are found not in the relation of VA>VB at the step 30, i.e. in a near-focus state, determination is made to find whether or not there obtains the condition of ∞ flag=1 in the same manner as in the case of the above-stated low level in-focus state.

Step 34: In the case of ∞ flag=1, the motor 8 is caused to rotate at a high speed to shift the lens group 1 in the infinity distance direction. The reason for rotating the motor at the high speed is as follows: A false in-focus signal might cause the nmotor 8 to come to lower its speed once around the point at which the false in-focus signal is produced in the same manner as in the case of a low level in-focus state while the lens group 1 is actually in an out-of-focus state.

Step 35: Meanwhile, in the case of ∞ flag=0, the motor 8 is caused to rotate at a low speed according to the general rule mentioned in the foregoing.

Step 36: Next, when a signal of the same direction is continuously and repeatedly produced more than n5 times, the device is brought back to the ordinary distance measuring mode in the same manner as at the step 32. If not, distance measurement is against performed in the low level distance measureing mode.

Figure 35A:
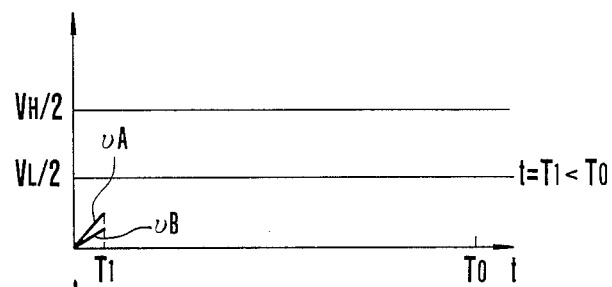
Figure 35B:
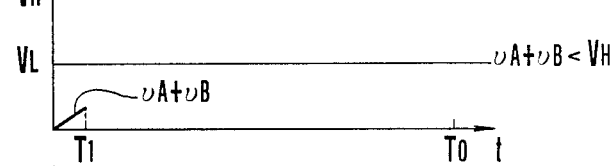
Figure 35C:
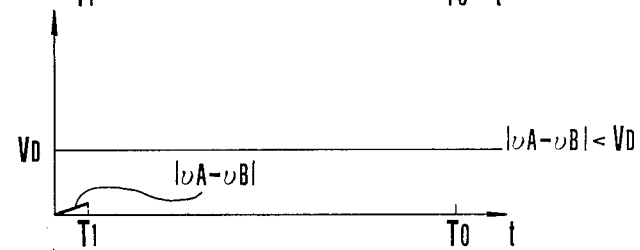

Step 37: When an in-focus state under a low level condition is determined and a signal is produced to bring the rotation of the motor 8 to a stop at the step 29, the operation of the device shifts to the low level distance measuring mode to resume distance measurement. In the case of the low level in-focus distance measuring mode, the condition for determining completion of distance measurement is $VA+VB \geq VL(VL<VH)$ or $t \geq T1$ (T1<T0 and, for example, T1 is 1.76 msec). This condition differs from the condition for determining completion of distance measurement employed in the low level distance measuring mode, i.e. it differs from the condition of $VA+VB \geq VH$ or $t \geq T0$. The purpose of this arrangement is the same as in the case of the ordinary in-focus distance measuring mode shown in FIG. 20. In other words, the time T1 is arranged to be shorter than the time T0 to broaden thereby the dead band as shown in FIGS. 35(a), 35(b) and 35(c) for the purpose of stably keeping the lens group 1 in a position determined as an in-focus position and, at the same time, saving the electric energy from being wasted. In the case of an in-focus state under a low level condition, in particular, the S/N ratio is poor as the levels of the integrated signals VA and VB are low. In such a case, the arrangement to broaden the dead band quite effectively stabilizes the in-focus state. Further, the reason for the adoption of the condition of $VA+VB \geq VL(VL<VH)$ is to permit in-focus determination in the ordinary distance measuring mode for the maximum integrating time T1.

Step 38: Upon completion of distance measurement, the condition of $VA+VB \geq VL$ is first determined. In the case of $VA+VB \geq VL$, the levels of the integrated signals are at a predetermined level or above and these signals are determined to have sufficiently grown for distance measurement in the ordinary distance measuring mode. Then, the distance measuring operation comes back to the ordinary distance measuring mode.

Step 39: In case that the condition of $VA+VB \geq VL$ is not obtained, determination is made to find whether the condition $|VA-VB| \geq VD$ obtains there. In the event of $|VA-VB| \geq VD$, the signals are determined to have sufficiently grown in the same way as in the case of the step 38 and the operation comes back to the ordinary distance measuring mode.

Step 40: In the case of $VA+VB<VL$ and $|VA-VB|<VD$, an in-focus state is determined to have been attained and the counting process continues until the integrating time "t" reaches the maximum integration time T0.

Step 41: Determination is made to find whether the distance measuring process in the low level in-focus distance measuring mode has been repeated n3 times. If it has been repeated n3 times, the operation comes back to the low level distance measuring mode. If it has been repeated less than n3 times, the distance measurement in the low level in-focus distance measuring mode is further repeated. Thus, in the same way as in the case of the ordinary in-focus distance measuring mode, the operation comes back to the low level distance measuring mode every time the distance measuring process has been repeated n3 times to set the condition for determining completion of distance measurement at $VA+VB \geq VH$ or $t \geq T0$, so that the dead band can be brought back to the original state for preventing degradation of the distance measurement accuracy. The arrangement to shift the low level in-focus distance measuring mode to the low level distance measuring mode simultaneously permits stabilization of an in-focus state under a low level condition, reduction in electric power consumption and prevention of degradation of accuracy.

Figure 22:
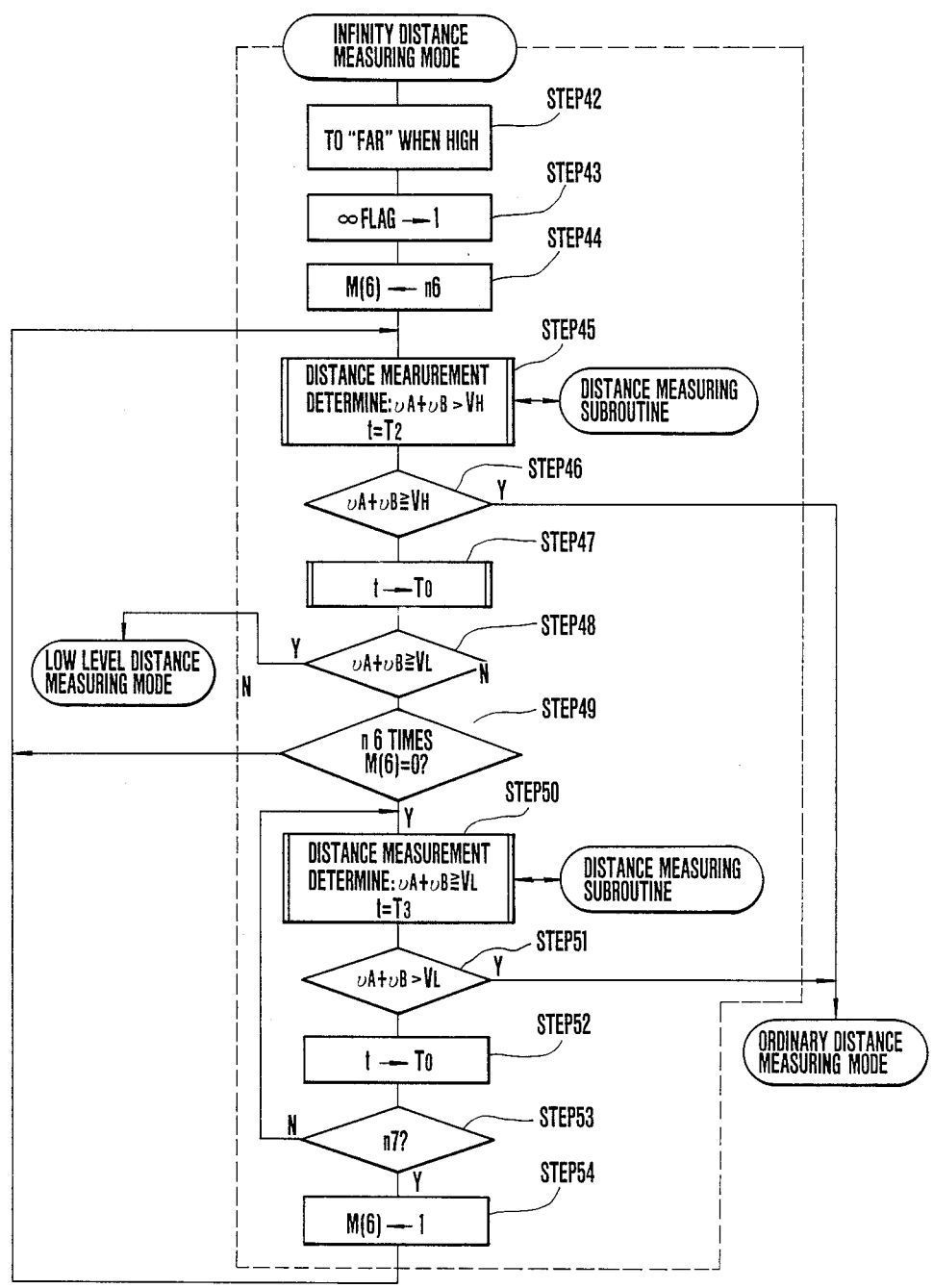

Referring to FIG. 22, the operation of the embodiment in the infinity distance measuring mode is as described below:

The shift of the operation to the infinity distance measuring mode takes place when a condition of $VA+VB<VL$ is determined at the step 26 of FIG. 21. As has been described with reference to the flow charts of FIGS. 20 and 21, the object is determined to be located at an infinity distance when the levels of both the integrated signals VA and VB are found extremely low through a distance measuring process. In that event, the operation of the embodiment is shifted to the infinity distance measuring mode which is suited for an object located at an infinity distance. Before a step 42 of this mode, the object to be photographed has already been determined to be located at the infinity distance. Therefore:

Step 42: The motor 8 is first caused to rotate at a high speed in the infinity distance direction.

Step 43: Following this, the ∞ flag is set at "1" to indicate the generation of an infinity signal. This ∞ flag is used for the purpose of discriminating a false in-focus signal as has already been described with reference to FIGS. 20 and 21 and is normally reset at "0" for the ordinary distance measuring mode.

Step 44: A number of repeating times n6 is set with a memory M(6) included in the RAM area of the micom used as counter for counting a predetermined number of times n6.

Figure 36A:
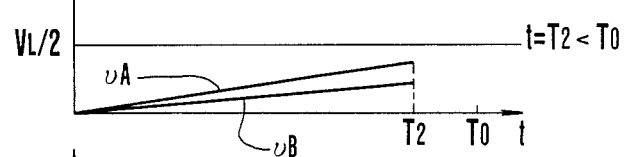
Figure 36B:
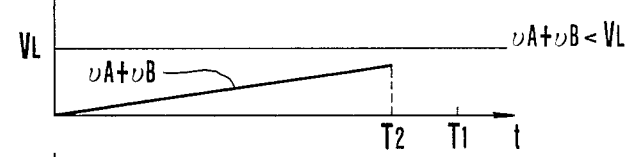
Figure 36C:
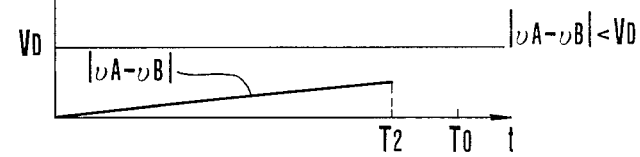

Step 45: In the infinity distance measuring mode, completion of distance measurement is determined on the basis of the condition of $VA+VB \geq VH$ or $t=T2$. In the case of this mode, the condition $|VA-VB| \geq VD$ which is one of the conditions to be used for determining completion of distance measurement in the ordinary distance measuring mode is excluded, because: In the infinity distance measuring mode, in the same manner as in the case of the low level distance measuring mode, the values or levels of both the integrated signals VA and VB are extremely low and, accordingly, the value of the signal "VA−VB" is not reliable. Further, the maximum distance measuring or integrating time is set at a time T2 (T2<T0 and, for example T2=19.3 msec) which is shorter than the maximum integrating time set for the low level distance measuring mode, because: With the condition of $VA+VB=VL$ used as a borderline, direction determination is made according to the value relation between the signals VA and VB under the condition VA+VB>VL and is made to be in the infinity distance direction irrespective of the value relation between the signals VA and VB in case of the condition VA+VB<VL. Therefore, in the event of a condition VA+VB≈VL, a noise or the like superposed on the signals VA and VB might cause an error in determining the direction and might result in hunting. The purpose of the above-stated arrangement to set the maximum integrating time at a shorter time is to solve this problem. As shown in FIGS. 36(a), 36(b) and 36(c), the change of the integration time from T0 to T2 instead of changing the value of the signal VL brings about the same advantageous effect.

Step 46: In the case of the condition $VA+VB \geq VH$, distance measurement is determined to be possible in the ordinary distance measuring mode and, accordingly, distance measurement is performed in the ordinary distance measuring mode.

Step 47: If the condition of $VA+VB \geq VH$ is not obtained, completion or termination of distance measurement is determined according to the condition of t=T2. Therefore, in that event, the length of time T0-T2 is counted.

Step 48: Determination is made to find whether or not the condition of $VA+VB \geq VL$ is obtained. In case of $VA+VB \geq VL$, distance measurement should be performed in the low level distance measuring mode as mentioned in the foregoing with reference to FIG. 21. In that event, therefore, the operation comes back to the low level distance measuring mode and a next distance measuring cycle begins.

Step 49: At this step, determination is made to find whether or not the distance measuring process has been continuously repeated n6 times since commencement of the infinity distance measuring mode. If not, the operation comes back to the step 45 and distance measurement is performed for the maximum integrating time T2. In other words, although the maximum integrating time is changed to T2 (T2<T0) for the predetermined period of time (or the predetermined number of times n6) after the commencement of the distance measurement in the infinity distance measuring mode, the maximum time is not changed to a length of time T3 (T3<T2<T0). The reasons for this are as follows:

The conditions under which the object is determined to be located at an infinity distance include: A condition in which the object csn be safely regarded as being located at an infinity distance because it is either actually at a long distance or has a low reflecting factor thus resulting in small value signals. In another condition, although the object is at a measurable distance, its limited size causes the distance measuring system to greatly deviate from the object distance. Accordingly, the reflected light spot image P or the light receiving element is deviated from the object 5. As a result, infinity distance determination at first causes the lens group 1 to be shifted toward the infinity distance position thereof. After that, however, distance measurement becomes possible when the reflected light spot image P comes to correctly move over the surface of the light receiving element 6 and the lens groups 1 is shifted to an in-focus position according to the difference between the values of the integrated signals VA and VB.

Under such a condition, arrangement to change the maximum integrating time to T3 (T3<T2<T0, for example, T3=1.76 msec) would broaden the dead band to retard a response and eventually to retard application of correct control to the motor 8 thus causing the motor to overrun an in-focus position. To avoid this, during the period of repeating distance measurement n6 times, the maximum integrating time is not changed from T2 (T2<T0) to T3 so that an infinity distance condition can be determined whether it is truly an infinity distance or just a transient condition in a focusing process as mentioned above.

During the distance measuring operation in the infinity distance measuring mode, the control circuit 111 incessantly produces a signal for driving the motor 8 to rotate in the infinity distance direction. However, upon arrival of the lens 1 at the infinity distance position thereof, an infinity switch 262 turns on to bring the motor 8 to a stop.

Step 50: When the number of repeating times exceeds n6 times, the distance measurement is performed on the basis of the maximum integrating time T3 which is shorter than the previous maximum time T2. Completion of distance measurement is determined on the basis of the condition $VA+VB \geq VL$ or $t \geq T3$. In the same manner as in the case of the low level in-focus distance measuring mode mentioned in the foregoing, the arrangement to change the maximum integrating time to T3 (T3<T2) broadens the dead band and thus makes a stabilizing effect and an electric power saving effect compatible.

Step 51: In case of $VA+VB \geq VL$, since the signal VA+VB has reached the comparison value VL despite the shortened maximum integrating time T3 (T3<T2), the signals VA and VB are determined to have reached sufficiently large values to permit distance measurement in the ordinary distance measuring mode. The operation then comes back to the ordinary distance measuring mode.

Step 52: In the event of VA+VB<VL, the integrated signals VA and VB are determined to be still at very low levels and the object 5 is determined to be at the infinity distance. Then, a length of time T0-T3 is counted.

Step 53: Determination is made to find whether the distance measuring process has been repeated n7 times at the maximum integrating time T3. If the number of repeating times has not reached the repeating number of times n7, the operation comes back to the step 50.

Step 54: When the distance measuring process has been repeated n7 times, distance measurement is once again performed at the maximum integrating time T2.

The integrating time is thus arranged to be shifted back to T2 at the end of every predetermined number of repeating times n7. The purpose of this arrangement is to prevent the degradation of distance measuring accuracy in the same manner as in the case of the above-stated low level in-focus distance measuring mode. At the step 44, the memory M(6) is set at M(6)=n6 for continuously repeating distance measurement n6 times at the maximum integrating time T2. At the step 54, however, the memory M(6) is set at M(6)=1 as the distance measurement is performed just once.

In the foregoing, the following five distance measuring modes have been described with reference to the flow charts of FIGS. 20, 21 and 22:

(1) Ordinary distance measuring mode; (2) Ordinary in-focus distance measuring mode; (3) Low level distance measuring mode; (4) Low level in-focus distance measuring mode; and (5) Infinity distance measuring mode.

As apparent from the foregoing description, the automatic focus detecting device according to the invention is arranged to perform distance measurement by selectively shifting the above distance measuring modes (1)–(5) from one to another as applicable. The invented arrangement permits a highly reliable stable operation compatibly with saving of power consumption.

In the specific embodiments described, the in-focus or out-of-focus determination is made on the basis of the absolute value |VA=VB| of difference between the integrated signals VA and VB which are indicative of the received position of the reflected light spot image P. However, this determination or decision is of course also obtainable from a ratio such as VA/VB. In other words, the present invention is applicable where the largeness and smallness relation or difference in value between the integrated signals VA and VB is obtainable whatever methods may be employed. Further, while the signal level is determined from the signal VA+VB in the embodiments given in the foregoing, the signal level may be determined from either one of the integrated signals VA and VB. In accordance with this invention, the levels of the signals VA and VB may be detected in any suitable manner. Further, in accordance with the invention, the light receiving element may be arranged to have more than three photo-sensitive areas.

According to the invention, in an automatic focus detecting device for an imaging optical system in which a light spot image is projected on an object and an image of the object is formed on a predetermined focal plane in accordance with a largeness and smallness relation between the integrated values of the outputs of a light receiving element which produces at least two signals as its outputs according to the received position of a reflected light resulting from the projected light spot, the device is provided with determining means for determining the position of the object of the basis of the integrated values of the outputs of the light receiving element; level detecting means for detecting the levels of the integrated values; and inhibiting means for inhibiting the determining means from determining an in-focus state even when the integrated values of the outputs of the light receiving element come to indicate an in-focus state if the determining means determines the object to be located at an infinity distance and if the level detecting means determines that the integrated values of the outputs of the light receiving element are below a predetermined level. This arrangement is highly advantageous as it eliminates the possibility of erroneous in-focus state detection in such a case where an object which is at first located at a long distance gradually comes nearer.

What we claim is:

1. An automatic focus detecting device for an imaging optical system comprising:

light receiving means having at least two distance measuring areas for receiving a reflection of light projected on an object and for producing signals from each of said distance measuring areas, said light receiving means having a light receiving position which varies for receiving the reflection according to a shift in the position of the imaging optical system;

first and second integrating means for integrating the respective signals produced from the areas of said light receiving means;

a subtractor for obtaining a difference between signals produced from said first and second integrating means;

an adder for obtaining the sum of the signals produced from said first and second integrating means;

first comparison means for comparing a signal produced by said adder with a first comparison signal;

second comparison means for comparing a signal produced by said subtractor with a second comparison signal;

time detecting means for measuring the integrating times t of said integrating means and comparing the magnitude of thus measured times and of predetermined maximum integrating time; and first focus determining means for determining an in-focus state in response to signals produced respectively by said first comparison means, said second comparison means and said time detecting means.

2. An automatic focus detecting device according to claim 1, further comprising:

third comparison means for determining the relation in magnitude between signals produced by said first and second integrating means, said third comparison means being arranged to receive said signals; and lens driving means for driving the imaging lens of said imaging optical system, said lens driving means being arranged to shift said imaging lens according to the signal produced by said third comparison means.

3. An automatic focus detecting device according to claim 2, further comprising:

fourth comparison means for comparing the signal produced by said adder with a fourth comparison signal in response to said fourth comparison signal, said fourth comparison means being arranged to supply a comparison output to said lens driving means for controlling the speed at which said imaging lens is shifted by said lens driving means.

4. An automatic focus detecting device according to claim 1, further comprising:

second focus determining means arranged to determine an in-focus state after said first focus determining means produces a signal indicative of an in-focus state of said imaging optical system;

said second focus determining means being arranged to receive a comparison signal having a wider in-focus state determining range than said first focus determining means.

5. An automatic focus detecting device according to claim 4, wherein said second focus determining means is arranged to repeat determination of an in-focus state a predetermined number of times; and said first focus determining means is arranged to perform an in-focus state determining action after said second focus determining means has completed repeating the determination of an in-focus state.

6. An automatic focus detecting device for an imaging optical system in which a light spot image is projected on an object and an image of the object is formed on a predetermined focal plane in accordance with a relation in magnitude between the integrated values of the outputs of a light receiving element which produces at least two signals as its outputs according to the received position of a reflection of light resulting from the projected light spot, comprising:

- level detecting means for detecting that the integrated values of the outputs of said light receiving element has reached a predetermined level;
- comparison means for detecting that the relation in magnitude between the integrated values of the outputs of said light receiving element have reached at least another predetermined level; and
- determining means for determining the focus adjusted state of said imaging optical system on the basis of the integrated values of the outputs of said light receiving element when at least either of said level detecting means or said comparison means has detected attainment of said predetermined level.

7. An automatic focus detecting device according to claim 6, wherein said level detecting means is arranged to detect whether or not the sum of the integrated values of the outputs of said light receiving means has reached a predetermined level.

8. An automatic focus detecting device according to claim 7, wherein said comparison means is arranged to detect whether or not the difference between the integrated values of the outputs of said light receiving means has reached a predetermined level.

9. An automatic focus detecting device according to claim 6, 7 or 8, further comprising:

- driving means for shifting said imaging optical system to an in-focus position on the basis of the output of said determining means.

10. An automatic focus detecting device according to claim 9, further comprising:

- level detecting means for detecting levels of the integrated values of the outputs of said light receiving element or means,
- wherein said determining means causes said driving means to operate at a low speed when the levels of said integrated values detected by said level detecting means are low and to operate at a high speed when the levels detected are high.

11. An automatic focus detecting device according to claim 9, wherein said determining means is arranged to cause said driving means to operate at a low speed for a predetermined period of time after the start thereof and at a high speed after the lapse of that period.

12. An automatic focus detecting device according to claim 11, wherein said determining means is a microcomputer.

13. A focus detecting device, comprising:

- light receiving means having at least two distance measuring areas for receiving a reflection of light projected on an object and producing a signal from each one of said distance measuring areas and at the same time varying a light receiving position for said reflected light according to a shift in the position of an imaging optical system;
- first and second integrating means for integrating the two output signals respectively from said light receiving means;
- a subtractor for obtaining a difference (VA−VB) between said output signals from the first and second integrating means;
- an adder for obtaining a sum (VA+VB) of said output signals from the first and second integrating means;
- first comparison means for introducing a comparison signal VH having a high level for setting up a set value of an insensitive zone with a narrow range and comparing the same with the sum signal (VA+VB) of said adder;
- second comparison means for introducing a comparison signal VL which has a low level for setting up the set value of the insensitive zone with a wide range and comparing the same with the sum signal (VA+VB) of said adder; and
- determining means for first determining an in-focus state under the condition of the narrow insensitive zone based on the signal from said first comparison means then determining an in-focus state under the condition of the wide insensitive zone based on the signal from said second comparison means.

14. A focus detecting device, comprising:

- light receiving means having at least two distance measuring areas for receiving a reflection of light projected on an object and producing a signal from each one of said distance measuring areas and at the same time varying a light receiving position for said reflected light according to a shift in the position of an imaging optical system;
- first and second integrating means each for integrating a respective output signal from said light receiving means;
- a subtractor for obtaining a difference (VA−VB) between said output signals from the first and second integrating means;
- an adder for obtaining a sum (VA+VB) of said output signals from the first and second integrating means;
- first comparison means for introducing a comparison signal VH which has a level for setting up a set value of an insensitive zone with a narrow range and comprising the same with the sum signal (VA+VB) by said adder;
- second comparison means for introducing a comparison signal VL which has a low level for setting up the set value of the insensitive zone with a wide range and comparing the same with the sum signal (VA+VB) of said adder;
- integrating time detecting means for detecting that the integrating time of said first and second integrating means has reached a prescribed length of time;
- third comparison means for comparing the magnitude of the output signals VA−VB of said first and second integrating means;
- determining means for introducing a comparison signal VD with a prescribed level which is to be used for comparison with said difference signal (VA−VB) and determining whether the integrating level of said integrating means is lower than the prescribed value or not; and
- distance measuring means for detecting an in-focus state based on the output of said adder and the output of said integrating time detecting means when the integrating level is at a low level state as detected by the determining action of said determining means.

15. A focus adjusting system, comprising:

an in-focus determining mode and a distance measuring mode, said in-focus determining mode comprising:

light receiving means having at least two distance measuring areas for receiving reflection of light projected on an object and producing a signal from each one of said distance measuring areas and at the same time varying a light receiving position for said reflected light according to a shift in the position of an imaging optical system;

first and second integrating means for integrating the two output signals respectively from said light receiving means;

first comparison means for comparing a first comparison signal VH which sets the set value of an insensitive zone at a narrow range with a sum signal of integrating outputs of each one of said integrating means;

second comparison means for comparing a second comparison signal VL which sets the set value of an insensitive zone at a wide range with the sum signal of the integrating outputs of each one of said integrating means;

integrating means detecting means for detecting that the integrating time of said integrating means has reached a prescribed length of time;

third comparison means for comparing a third comparison signal VD at a predetermined level with the difference signal VA−VB of the integration outputs VA−VB of said integrating means;

determining means for performing an in-focus determining action under the wide insensitive zone for a predetermined number of times based on the output signals of said second comparison means and said integrating time detecting means, then thereafter determining a shift to an in-focus determining action under the arrow insensitive zone based on the output signal of said third comparison means; and distance measuring means for performing a distance measuring action after said determining action by the determining means.

16. An automatic focus adjusting system comprising:
an imaging lens for forming an image of an object at an imaging position;
a motor for driving said imaging lens;
driving means for controlling the driving of said motor;
light receiving means having at least two distance measuring areas for receiving reflection of light projected on an object and producing a signal from each one of said distance measuring areas and at the same time varying a light receiving position for said reflected light according to a shift in the position of an imaging optical system;
first and second integrating means for integrating the two output signals respectively from said light receiving means;
a subtractor for obtaining a difference (VA−VB) between said output signals from the first and second integrating means;
an adder for obtaining a sum (VA+VB) of said output signals from the first and second integrating means;
first comparison means for introducing a comparison signal VH which has a high level for setting up a set value of an insensitive zone with a narrow range and comparing the same with the sum signal (VA+VB) by said adder;
second comparison means for introducing a comparison signal which has a low level for setting up the set value of the insensitive zone with a wide range and comparing the same with the sum signal (VA+VB) of said adder;
integrating time detecting means for detecting that the integrating time of said first and second integrating means has reached a prescribed length of time;
third comparison means for comparing the magnitude of the output signals VA−VB of said first and second integrating means;
first in-focus determining means for introducing a third comparison signal VD which has a prescribed level for comparison with said difference signal (VA−VB) and determining whether the imaging lens is in the in-focus state or not; and
means for selecting the rotating direction of said motor based on the comparison result by said third comparison means that the determining action by said first in-focus determining means.

17. An automatic focus adjusting system, comprising:
an imaging lens for forming an image of an object at an imaging position;
a motor for driving said imaging lens;
driving means for controlling the driving of said motor;
light receiving means having at least two distance measuring areas for receiving a reflection of light projected on an object and producing a signal from each one of said distance measuring areas and at the same time varying a light receiving position for said reflected light according to a shift in the position of an imaging optical system;
first and second integrating means for integrating the two output signals respectively from said light receiving means;
a subtractor for obtaining a difference (VA−VB) between said output signals from the first and second integrating means;
an adder for obtaining a sum (VA+VB) of said output signals from the first and second integrating means;
first comparison means for introducing a comparison signal VH which has a high level for setting up a set value of an insensitive zone with a narrow range and comparing the same with the sum signal (VA+VB) by said adder;
second comparison means for introducing a comparison signal VL which has a low level for setting up the set value of the insensitive zone with a wide range and comparing the same with the sum signal (VA+VB) of said adder;
integrating time detecting means for detecting that the integrating time of said first and second integrating means has reached a prescribed length of time;
third comparison means for comparing the magnitude of the output signals VA−VB of said first and second integrating means;
means for determining an imaging state of the imaging lens based on the comparison result of said third comparison means; and
means for selecting the rotational speed of said motor based on the output signal of said second comparison means after the determining action by said determining means.

18. An automatic focus adjusting system comprising:

an imaging lens for forming an image of an object at an imaging position;
a motor for driving said imaging lens;
driving means for controlling the driving of said motor;
light receiving means having at least two distance measuring areas for receiving reflection of light projected on an object and producing a signal from each one of said distance measuring areas and at the same time varying a light receiving position for said reflected light according to a shift in the position of an image optical system;
first and second integrating means for integrating the two output signals respectively from said light receiving means;
a subtractor for obtaining a difference (VA−VB) between said output signals from the first and second integrating means;
first comparison means for introducing a comparison signal VH which has a high level for setting up a set value of an insensitive zone with a narrow range and comparing the same with the sum signal (VA+VB) by said adder;
second comparison means for introducing a comparison signal VL which has a low level for setting up the set value of the insensitive zone with a wide range and comparing the same with the sum signal (VA+VB) of said adder;
integrating time detecting means for detecting that the integrating time of said integrating means has reached a prescribed length of time;
means for introducing a third comparison signal VD which has a prescribed level for comparison with the difference signal (VA−VB) of said subtractor and detecting a relationship of said difference signal (VA−VB)≧said third signal VD, after said prescribed length of time, then shifting the device to a low level mode;
first determining means for determining that the comparison action by said first comparison means is:

(VA+VB)<VH;

and
second determining means for determining, after the determining action of said first determining action, that the relationship of the sum signal (VA+VB) of said adder and the second comparison signal VL is the sum signal (VA+VB)<VL; and
means to cause said motor to drive the imaging lens to the infinite direction based on the determining result of said second determining means.

19. An automatic focusing system, comprising:
a lens for forming an image of an object at an imaging position;
a motor for driving said imaging lens;
a motor driving means;
light receiving means having at least two distance measuring areas for receiving a reflection of light projected on an object and producing a signal from each one of said distance measuring areas and at the same time varying a light receiving position for said reflected light according to a shift in the position of an imaging optical system;
first and second integrating means for integrating the two output signals respectively from said light receiving means;
a subtractor for obtaining a difference (VA−VB) between said output signals from the first and second integrating means;
an adder for obtaining a sum (VA+VB) of said output signals from the first and second integrating means;
first comparison means for introducing a comparison signal VH which has a high level for setting up a set value of an insensitive zone with a narrow range and comparing the same with the sum signal (VA+VB) by said adder;
second comparison means for introducing a comparison signal VL which has a low level for setting up the set value of the insensitive zone with a wide range and comparing the same with the sum signal (VA+VB) of said adder;
third comparison means for introducing a signal (VD) which has a prescribed level for comparison with the difference signal (VA−VB) of said subtractor; and
time detecting means for counting time of the integrating time of said integrating means, said time detecting means setting up an integrating time T0 for performing a distance measured under a normal integrating state based on the comparison result by said first and third comparison means and setting up an integrating time T2 for performing the distance measurement under a low integrating level stated based on the comparison result of said first and second comparison means and for shifting said imaging lens to the infinite direction,
wherein the relationship between said integrating times T0 and T2 is set to satisfy:

T0>T2.

20. A focus detecting device, comprising:
a lens for forming an image of an object at an imaging position;
a motor for driving said imaging lens;
a motor for driving means;
light receiving means having at least two distance measuring areas for receiving a reflection of light projected on an object and producing a signal from each one of said distance measuring areas and at the same time varying a light receiving position for said reflected light according to a shift in the position of an imaging optical system;
first and second integrating means for integrating the two output signals respectively from said light receiving means;
a subtractor for obtaining a difference (VA−VB) between said output signals from the first and second integrating means;
an adder for obtaining a sum (VA+VB) of said output signals from the first and second integrating means;
first comparison means for introducing a comparison signal VH which has a high level for setting up a set value of an insensitive zone with a narrow range and comparing the same with the sum signal (VA+VB) by said adder;
second comparison means for introducing a comparison signal VL which has a low level for setting up the set value of the insensitive zone with a wide range and comparing the same with the sum signal (VA+VB) of said adder;

third comparison means for introducing a signal (VD) which has a prescribed level for comparison with the difference signal (VA−VB) of said subtractor; and motor speed control means, said means controlling the speed of motor to a low level when the conditional formula, $$VA+VB \geq VA-VB/K0 = V2$$

is satisfied, wherein the ratio between the third comparison signal VD and the second comparison signal VL, that is VO/VL, is represented by k0.

21. A range finding apparatus comprising:
    (a) emitting means for emitting light onto an object;
    (b) receiving means having at least first and second light receiving regions, said receiving means receiving light reflected from said object and integrating signals corresponding to said reflected light for each light receiving region;
    (c) adder means for adding an integrated value at said first and second light receiving regions;
    (d) subtractor means for subtracting the integrated value at the first and second light receiving regions;
    (e) first, second and third comparison means, said first comparison means having a first comparison level for comparing said first comparison level with an output of said adder means, said second comparison means having a second comparison level for comparing said second comparison level with an output of said subtractor means, and said third comparison means setting a predetermined period of time for comparing said predetermined period of time with the integration value;
    (f) prohibit means for prohibiting the emission of the light by said emitting means when at least one of said first, second and third comparison means produces an output; and
    (g) computing means for making a computation for a range finding against the object based on an output of said first, second or third comparison means.

22. A focus detection device for emitting light onto an object and receiving light reflected from said object by receiving means, thus making a focus detection for an imaging optical system based on signals received by said receiving means, comprising:
    discriminating means for performing a first mode operation in which the focus adjustment of said imaging optical system is discriminated on the basis of comparison of the signal with a first reference level, and a second mode operation in which the focus adjustment of said imaging optical system is discriminated on the basis of comparison of the signal with a second reference level; and
    control means for controlling said discriminating means, said control means shifting said discriminating means to the second mode operation when an in-focus state is discriminated by the first mode operation and returns the discriminating means to the first mode operation when the in-focus state is discriminated by the second mode operation.

23. A device according to claim 22, wherein said discriminating means and said control means are a single microcomputer.

24. A focus detection method for focus adjustment of a photographic optical system, comprising the steps of:
    a first step of performing a first mode operation to discriminate a focus adjustment of the photographic optical system on the basis of a narrow in-focus range;
    a second step of performing a second mode operation to discriminate the focus adjustment of the photographic optical system on the basis of a broad in-focus range when the photographic optical system is discriminated to be in the in-focus state by the first mode operation;
    a third step of repeating the second mode operation when the second mode operation is performed by the second step and the photographic optical system is discriminated to be in the in-focus state by the second mode operation; and
    a fourth step of performing the first mode operation again when the photographic optical system is discriminated to be in the in-focus state for a predetermined time by the third step.

* * * * *